US 8,589,348 B2

(12) United States Patent
Tobin et al.

(10) Patent No.: US 8,589,348 B2
(45) Date of Patent: Nov. 19, 2013

(54) SYSTEM, METHOD AND COMPUTER PROGRAM PRODUCT FOR CONVERTING A FORMAT OF REPORT RESULTS

(75) Inventors: Thomas J. Tobin, San Francisco, CA (US); Vladislav Eroshin, Menlo Park, CA (US); Zuye Zheng, San Francisco, CA (US); Patrick Louie, San Francisco, CA (US); Jeremiah Lu, Union City, CA (US); Arunkumaran Varadharajan, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 13/306,923

(22) Filed: Nov. 29, 2011

(65) Prior Publication Data

US 2013/0031054 A1 Jan. 31, 2013

Related U.S. Application Data

(60) Provisional application No. 61/527,310, filed on Aug. 25, 2011, provisional application No. 61/511,897, filed on Jul. 26, 2011.

(51) Int. Cl.
G06F 7/00 (2006.01)
G06F 17/00 (2006.01)
G06F 13/14 (2006.01)

(52) U.S. Cl.
USPC .......................................... 707/635

(58) Field of Classification Search
USPC ........... 707/1/1, 608, 635, 760; 715/200, 209, 715/249, 255; 705/1.1, 50, 64; 709/206, 709/225–227; 718/100–102; 717/106
See application file for complete search history.

(56) References Cited

U.S. PATENT DOCUMENTS

| 7,698,160 | B2 | 4/2010 | Beaven et al. |
| 7,730,478 | B2 | 6/2010 | Weissman |
| 7,779,039 | B2 | 8/2010 | Weissman et al. |
| 8,082,301 | B2 | 12/2011 | Ahlgren et al. |
| 8,095,413 | B1 | 1/2012 | Beaven |
| 8,095,594 | B2 | 1/2012 | Beaven et al. |
| 8,275,836 | B2 | 9/2012 | Beaven et al. |
| 2006/0031358 | A1* | 2/2006 | Canis .......................... 709/206 |
| 2006/0085742 | A1* | 4/2006 | Harold et al. ................. 715/517 |
| 2006/0235715 | A1* | 10/2006 | Abrams et al. ................. 705/1 |
| 2013/0031053 | A1 | 1/2013 | Tobin et al. |
| 2013/0031141 | A1 | 1/2013 | Tobin et al. |
| 2013/0031491 | A1 | 1/2013 | Tobin et al. |
| 2013/0031555 | A1 | 1/2013 | Tobin et al. |

OTHER PUBLICATIONS

Non-Final Office Action from U.S. Appl. No. 13/306,852, dated Nov. 14, 2012.
Non-Final Office Action from U.S. Appl. No. 13/306,900, dated Nov. 20, 2012.

(Continued)

*Primary Examiner* — Usmaan Saeed
*Assistant Examiner* — Cecile Vo
(74) *Attorney, Agent, or Firm* — Zilka-Kotab, PC

(57) ABSTRACT

In accordance with embodiments, there are provided mechanisms and methods for converting a format of report results. These mechanisms and methods for converting a format of report results can provide report results in a format that is usable for multiple purposes. The ability to provide reports results in an application independent format enables versatility of the reports results.

16 Claims, 19 Drawing Sheets

(56) References Cited

OTHER PUBLICATIONS

Non-Final Office Action from U.S. Appl. No. 13/306,852, dated Jul. 8, 2013.

Advisory Action from U.S. Appl. No. 13/306,900, dated Sep. 9, 2013.
Final Office Action from U.S. Appl. No. 13/306,900, dated Jun. 21, 2013.
Non-Final Office Action from U.S. Appl. No. 13/306,921, dated Jun. 21, 2013.

* cited by examiner

| Long User Name | Longest Account Name | Longest Type Name | Last Modified Date | Billing State Province |
|---|---|---|---|---|

FIGURE 14A

| style="width:50px" | style="width:85px" | style="width:75px" | style="width:55px" | style="width:45px" |
|---|---|---|---|---|
| Account Owner | Account Name | Type | Last Modified Date | Billing State Province |

FIGURE 14B

| style="width:50px" | style="width:85px" | style="width:75px" | style="width:55px" | style="width:45px" |
|---|---|---|---|---|
| Test User | Acme | Longest Type Name | 03-11-2010 | CA |
| Test User | Salesforce.com | Prospect | 03-11-2010 | NV |

FIGURE 14C

| style="width:50px" | style="width:85px" | style="width:75px" | style="width:55px" | style="width:45px" |
|---|---|---|---|---|
| Long User Name | Long Account Name | Prospect | 03-11-2010 | IL |
| Long User Name | Longest Account Name | Analyst | 03-11-2010 | NY |

FIGURE 14D

# SYSTEM, METHOD AND COMPUTER PROGRAM PRODUCT FOR CONVERTING A FORMAT OF REPORT RESULTS

CLAIM OF PRIORITY

This application claims the benefit of U.S. Provisional Patent Application 61/527,310 entitled "Methods and Systems for Serializing Report Data in a Temporary Store," by Tobin et al., filed Aug. 25, 2011 , and U.S. Provisional Patent Application 61/511,897 entitled "Methods and Apparatus of Executing a Joined Report," by Tobin et al., filed Jul. 26, 2011, all of which the entire contents are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States patents and patent applications, including the present application, are related to each other. Each of the other patents/applications are incorporated by reference herein in its entirety:

U.S. patent application Ser. No. 13/306,852 entitled "SYSTEM, METHOD AND COMPUTER PROGRAM PRODUCT FOR LOCALLY DEFINING RELATED REPORTS USING A GLOBAL DEFINITION", by Tobin et al., filed Nov. 29, 2011 ;

U.S. patent application Ser. No. 13/306,900 entitled "SYSTEM, METHOD AND COMPUTER PROGRAM PRODUCT FOR DISTRIBUTED EXECUTION OF RELATED REPORTS", by Tobin et al., filed Nov. 29, 2011 ;

U.S. patent application Ser. No. 13/306,905 entitled "SYSTEM, METHOD AND COMPUTER PROGRAM PRODUCT FOR PROGRESSIVE RENDERING OF REPORT RESULTS", by Tobin et al., filed Nov. 29, 2011 ; and U.S. patent application No. 13/306,921 entitled "SYSTEM, METHOD AND COMPUTER PROGRAM PRODUCT FOR CONDITIONALLY EXECUTING RELATED REPORTS IN PARALLEL BASED ON AN ESTIMATED EXECUTION TIME", by Tobin et al., filed Nov. 29, 2011.

FIELD OF THE INVENTION

One or more implementations relate generally to reporting in a computing environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional computing environments, reports are generated for providing structure data. For example, a report may be generated by querying data from a database and formatting the data retrieved by the query according to a predefined reporting structure. Unfortunately, conventional techniques relating to the generation and provisioning of reports have exhibited various limitations.

Accordingly, it is desirable to provide techniques enhancing the manner in which reports can be generated and provisioned, to improve performance and usability of a reporting system.

BRIEF SUMMARY

In accordance with embodiments, there are provided mechanisms and methods for converting a format of report results. These mechanisms and methods for converting a format of report results can enable embodiments to provide report results in a format that is usable for multiple purposes. The ability of embodiments to provide reports results in an application independent format enables versatility of the reports results.

In an embodiment and by way of example, a method for converting a format of report results is provided. In use, results from an execution of a report are received, where the results include content comprising detailed data and aggregate data summarizing at least a subset of the detailed data. Additionally, each of the results is converted to a format including an indicator of whether the content of the result is of a detailed data type of an aggregate data type, a size of the content of the result, and the content of the result. Further, the converted results are stored.

While one or more implementations and techniques are described with reference to an embodiment in which converting a format of report results is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIGS. 14A-D illustrate data associated with setting fixed column widths when progressively rendering report results, in accordance with an embodiment;

DETAILED DESCRIPTION

General Overview

Systems and methods are provided for converting a format of report results.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing converting a format of report results will be described with reference to example embodiments.

Figure 1:
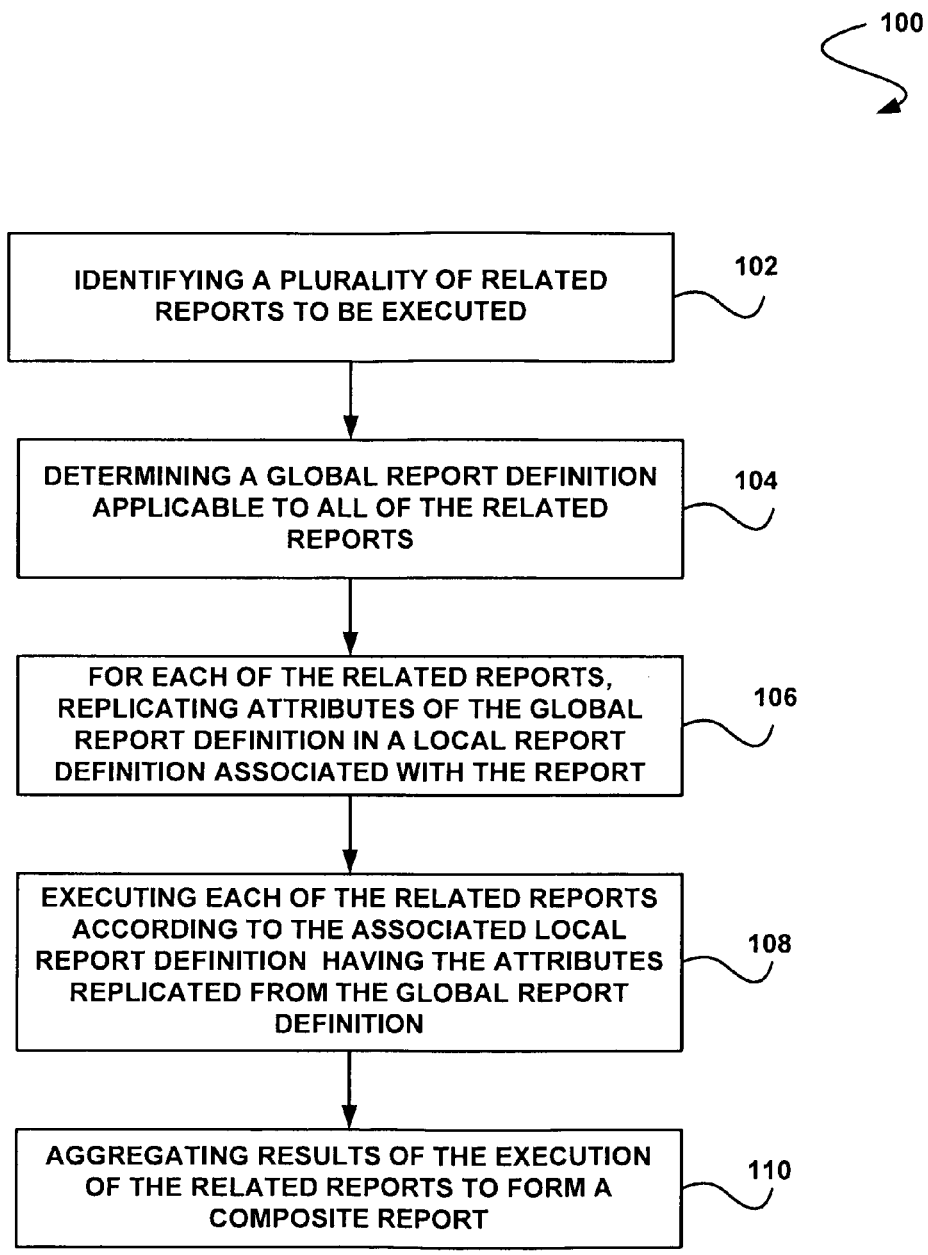
FIG. 1 illustrates a method for locally defining related reports using a global definition, in accordance with an embodiment.

FIG. 1 illustrates a method 100 for locally defining related reports using a global definition, in accordance with an embodiment. As an option, the method 100 may be carried out in the context of a multi-tenant on-demand database system. As shown in operation 102, a plurality of related reports to be executed is identified. In the context of the present description, a report is a query for data stored in a data repository (e.g. database, etc.). For example, the report may include a query for data stored in a multi-tenant on-demand database system. Thus, execution of each of the related reports may include execution of a query. As an option, each report may be defined by a report template.

Additionally, the related reports may include two or more reports that have at least one commonality. In one embodiment, the related reports may be individual reports that are related via at least one common object (e.g. table, etc.) used for generating the related reports. Just by way of example, each related report may be a joined relationship between a different object and the at least one common object (e.g. where report #1 is a joined relationship between a first table and a second table, and report #2 is a joined relationship between the first table and a third table).

As an option, the related reports may be identified from a request for the composite report. For example, a request for a composite report may be received from a user or application, where the composite report (e.g. by a preconfigured definition) is only capable of being generated by aggregating results of the related reports. It should be noted, however, that the related reports may be identified in any desired manner.

Additionally, as shown in operation 104, a global report definition applicable to all of the related reports is determined. The global report definition may include any parameters (e.g. attributes) capable of being used for defining a report. For example, the global report definition may define the template used for executing a report. It should be noted that such global report definition may be user-defined, as an option.

In one embodiment, the global report definition may be configured for (e.g. specific to) the composite report. Thus, the global report definition may be determined in response to the aforementioned request for the composite report. In this way, the global report definition may be applicable to all of the related reports by virtue of the related reports being identified from the request for the composite report.

As another option, the global report definition may be determined to be applicable to all of the related reports by having attributes that are each applicable to all of the related reports. Such attributes may include at least one filter criterion, such as a parameter for filtering data in a particular column of one of the objects that is a subject of the report. As another example, the attributes may include at least one grouping, such as a parameter defining a summary to be calculated from data in one or more particular columns of one of the objects that is a subject of the report. In one embodiment, the attributes of the global report definition may be applicable to all of the related reports by each attribute being applicable to a column of each of the related reports.

Further, for each of the related reports, attributes of the global report definition are replicated in a local report definition associated with the report. Note operation 106. For example, each of the local report definitions may be specific to (e.g. user-defined for, etc.) an associated one of the related reports. Each local report definition may include local attributes specific to the associated report, and thus include parameters (e.g. attributes) capable of being used for defining the associated report.

In the present embodiment, the attributes of the global report definition may be replicated to the local report definition such that the local report definition includes all of the attributes of the global report definition. In one embodiment, the attributes of the global report definition may be replicated to each local report definition by storing the global report definition attributes in each of the local report definition, in another embodiment, the attributes of the global report definition may be replicated to each local report definition by determining, for each related report, a portion (e.g. column) of the report to which the global report definition is applicable. Such determination may be made, for example, since columns, or other data portions, amongst the composite and/or related reports may have different identifiers (e.g. names) for the same underlying column, or data portion, of data in the data repository. As an option, the determination may be made by mapping each global report definition attribute to a portion of each related report (e.g. using a mapping table or other metadata).

Just by way of example, replicating the attributes of the global report definition to each local report definition may include (1) mapping each attribute to a column of the report associated with the local report definition; (2) translating the attribute to indicate an identifier of the column of the report associated with the local report definition; and (3) storing in the local report definition the translated attribute indicating the identifier of the column of the report associated with the local report definition. As noted above, the mapping may be performed using a table, such as a table correlating an identifier of a column indicated by the attribute of the global report definition with the identifier of the column of the report associated with the local report definition.

As an option, a location in the local report definition in which the global definition attributes are stored may be based on a type of the global definition attributes. For example, where the attribute includes a grouping, the attribute may stored in the local report definition by being prepended to content (e.g. existing local attributes) of the local report definition, such that the attribute is stored at a beginning of the local report definition. As another example, where the attribute includes a filter criterion, the attribute may be stored in the local report definition by being appended to content of the local report definition, such that the attribute is stored at an end of the local report definition. Further, Boolean logic may be used for prepending/appending the attributes to the local report definition. Thus, a particular sequence of attributes stored in the local report definition may be provided, for controlling a sequence in which the attributes are applied to the execution of the associated report.

As another option, the attributes of the global report definition may be replicated to the local report definition of each associated report at runtime of the execution of the related reports. Performing the replication at runtime may ensure the current metadata describing the composite and/or related reports is utilized with respect to the replication.

Each of the related reports is then executed according to the associated local report definition having the attributes replicated from the global report definition, as shown in operation 108. As noted above, each of the related reports may be a query. Accordingly, each of the related reports may be executed by executing an associated query according to the local attributes of the associated local report definition which includes the attributes replicated from the global report definition.

In one embodiment, each related report may be executed according to the local attributes specific to the local report definition and the global attributes replicated from the global report definition that are common to each of the local report definitions by virtue of the replication of such global report definition attributes to each of the local report definitions. Thus, the related reports may be executed according to some common parameters (e.g. the replicated global report definition attributes) and optionally some unique parameters (e.g. the local attributes specific to the local report definition).

Moreover, as shown in operation 110, results of the execution of the related reports are aggregated to form a composite report. Such composite report may include the above described requested composite report, by which the related reports were optionally identified in operation 102. Thus, the composite report may be formed from the results of the execution of the related reports for providing the same to the requesting user/application.

In one embodiment, the results of the execution of the related reports may be aggregated by joining the results of the execution of the related reports. The results may be joined using a common grouping replicated from the global report definition to each of the local report definitions and thus used as a parameter for execution of the related reports. For example, the common grouping may provide in the results for each of the related reports a common attribute (e.g. such as a common column in the resulting data set) by which the results of the execution of the related reports may be joined to form the composite report. Of course, it should be noted that the results of the execution of the related reports may be aggregated in any desired manner for forming the composite report to have all of the results of the execution of the related reports.

Figure 2:
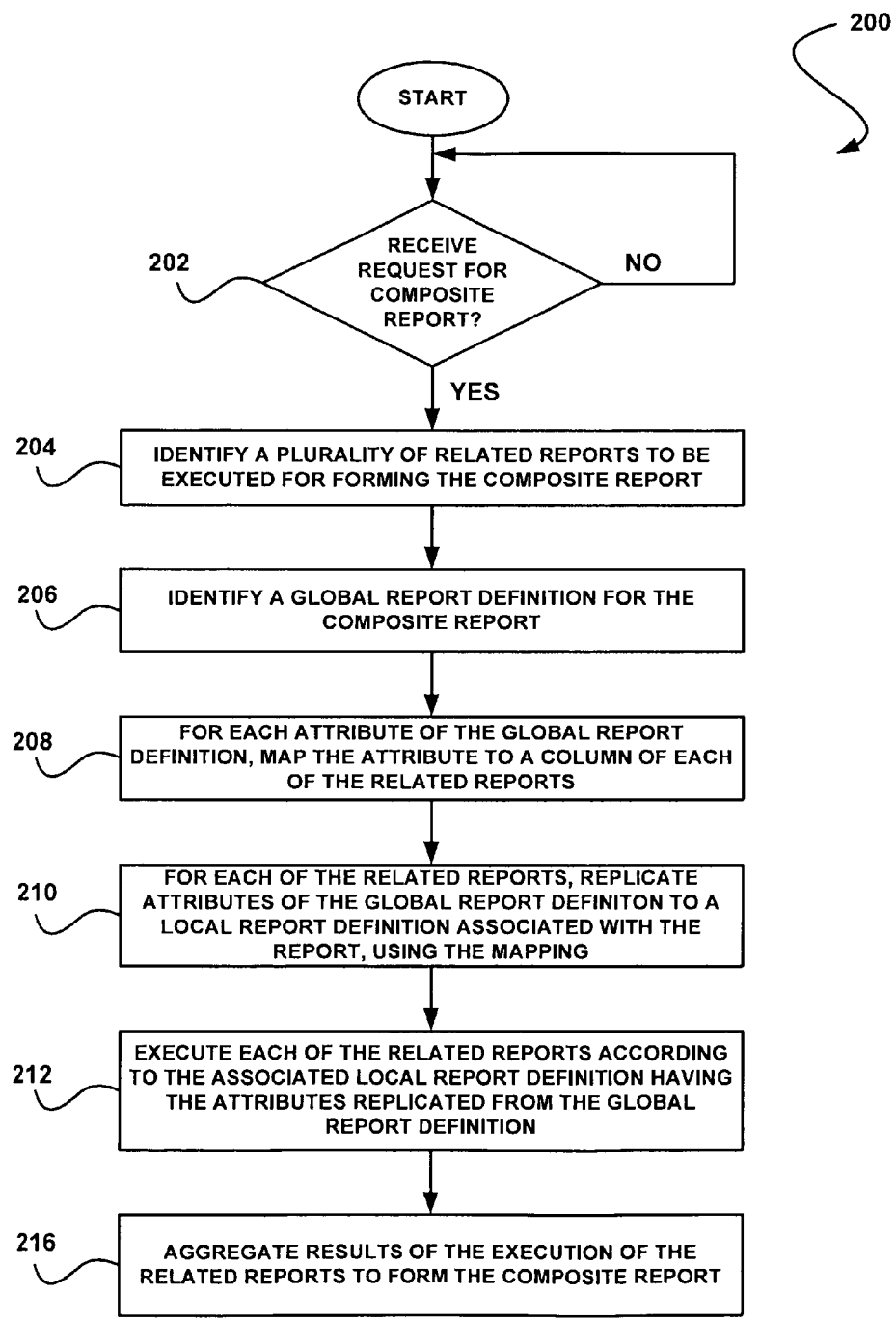
FIG. 2. illustrates a method for forming a composite report from multiple related reports executed according to respective local report definitions having attributes replicated from a single global report definition, in accordance with an embodiment.
Figures 3A, 3B:
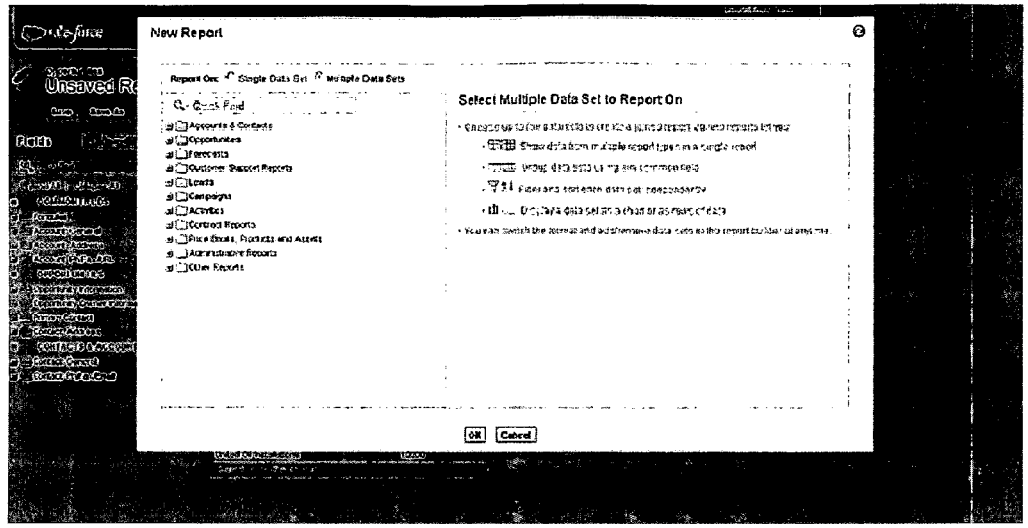
FIGS. 3A-3E illustrate various examples of user interfaces capable of being used for defining a composite report template, in accordance with various embodiments.
Figure 3C:
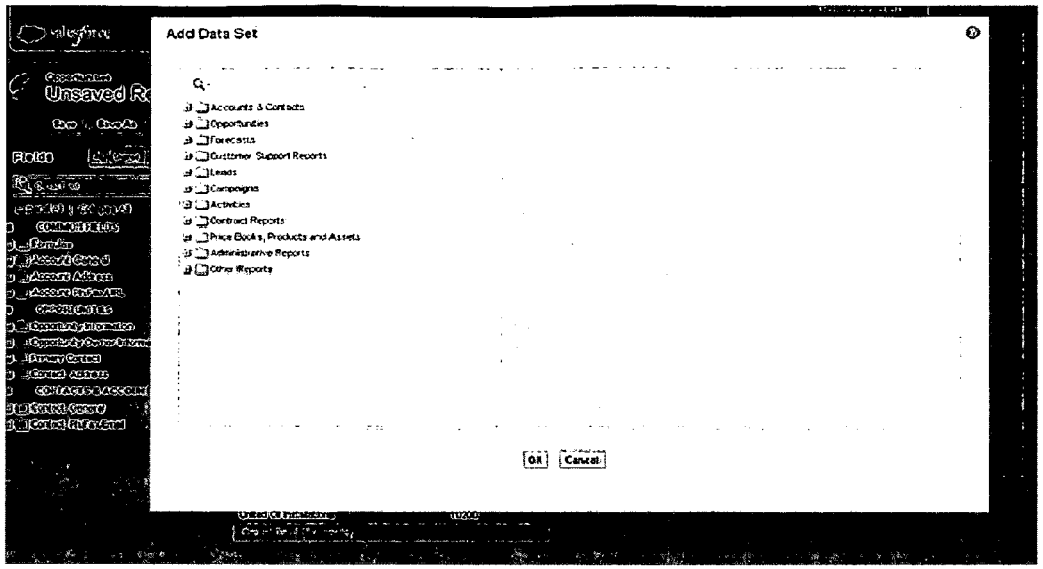
Figure 3D:
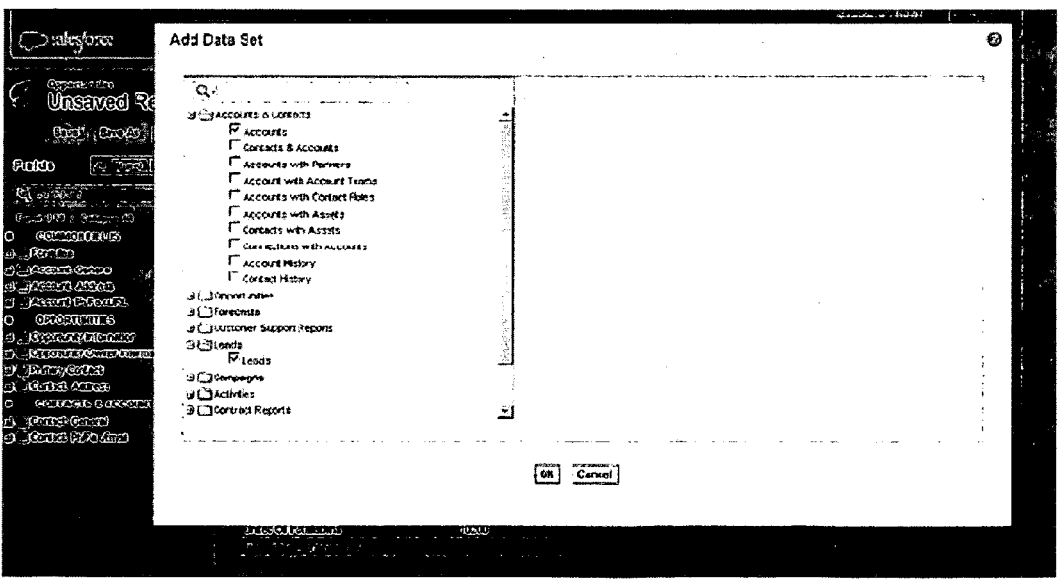
Figure 3E:
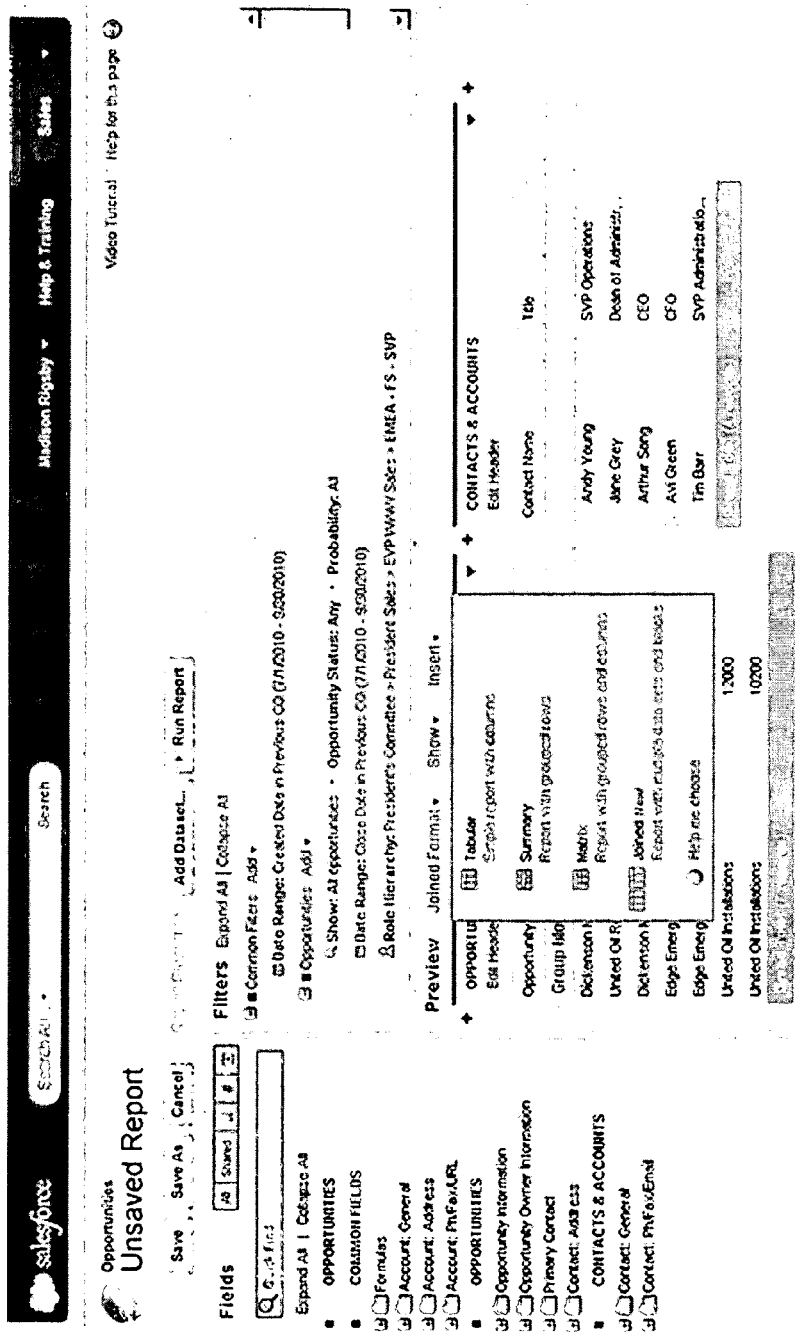

FIG. 2. illustrates a method 200 for forming a composite report from multiple related reports executed according to respective local report definitions having attributes replicated from a single global report definition, in accordance with an embodiment. As an option, the method 200 may be carried out in the context of the details of FIG. 1. Of course, however, the method 200 may be carried out in any desired environment. Further, the aforementioned definitions may equally apply to the description below.

As shown in decision 202, it is determined whether a request for a composite report is received. The request may be received from a user and/or an application. For example, the request may be for a report on data stored on behalf of the user by multi-tenant on-demand database system (e.g. where the user is a tenant of the multi-tenant on-demand database system). Further, such user request may be received from a user via a webpage of the multi-tenant on-demand database system.

The composite report may be predefined using a template, as an option. For example, FIGS. 3A-E illustrate various examples of user interfaces (e.g. of the multi-tenant on-demand database system) capable of being used for defining a composite report template. As shown, these user interfaces may allow for selection of a first report template, a second report template, and a type of join operation to be used for joining reports executed according to the first report template and the second report template.

If it is determined that a request for a composite report is not received, the method 200 continues to wait for such a request. However, in response to receipt of a request for a composite report, a plurality of related reports to be executed for forming the composite report is identified. Note operation 204. For example, the composite report template may define the related reports to be used for forming the composite report. A global report definition for the composite report is also identified, as shown in operation 206. For example, the global report definition may be defined in the composite report template, or defined separately from the composite report template and referenced by the composite report template.

For each attribute of the global report definition, the attribute is mapped to a column of each of the related reports. Note operation 208. For example, the global report definition may include an identifier (e.g. name) of a column to which the attribute applies, but a related report may reference such column by a different identifier. Thus, the column name referenced by the global report definition may be mapped to the identifier provided by the related report for the same column. Such mapping may be performed using a mapping table.

Further, for each of the related reports, attributes of the global report definition are replicated to a local report definition associated with the report, using the mapping. Note operation 210. For example, for each related report, each global report definition attribute may be translated to reference the identifier (e.g. name) of the associated column of the related report (i.e. as determined by the mapping). The attributes translated for a given related report may then be stored in the local report definition of the related report.

Moreover, as shown in operation 212, each of the related reports is executed according to the associated local report definition having the attributes replicated from the global report definition. The results of the execution of the related reports are then aggregated to form the composite report, as shown in operation 214.

Figure 4:
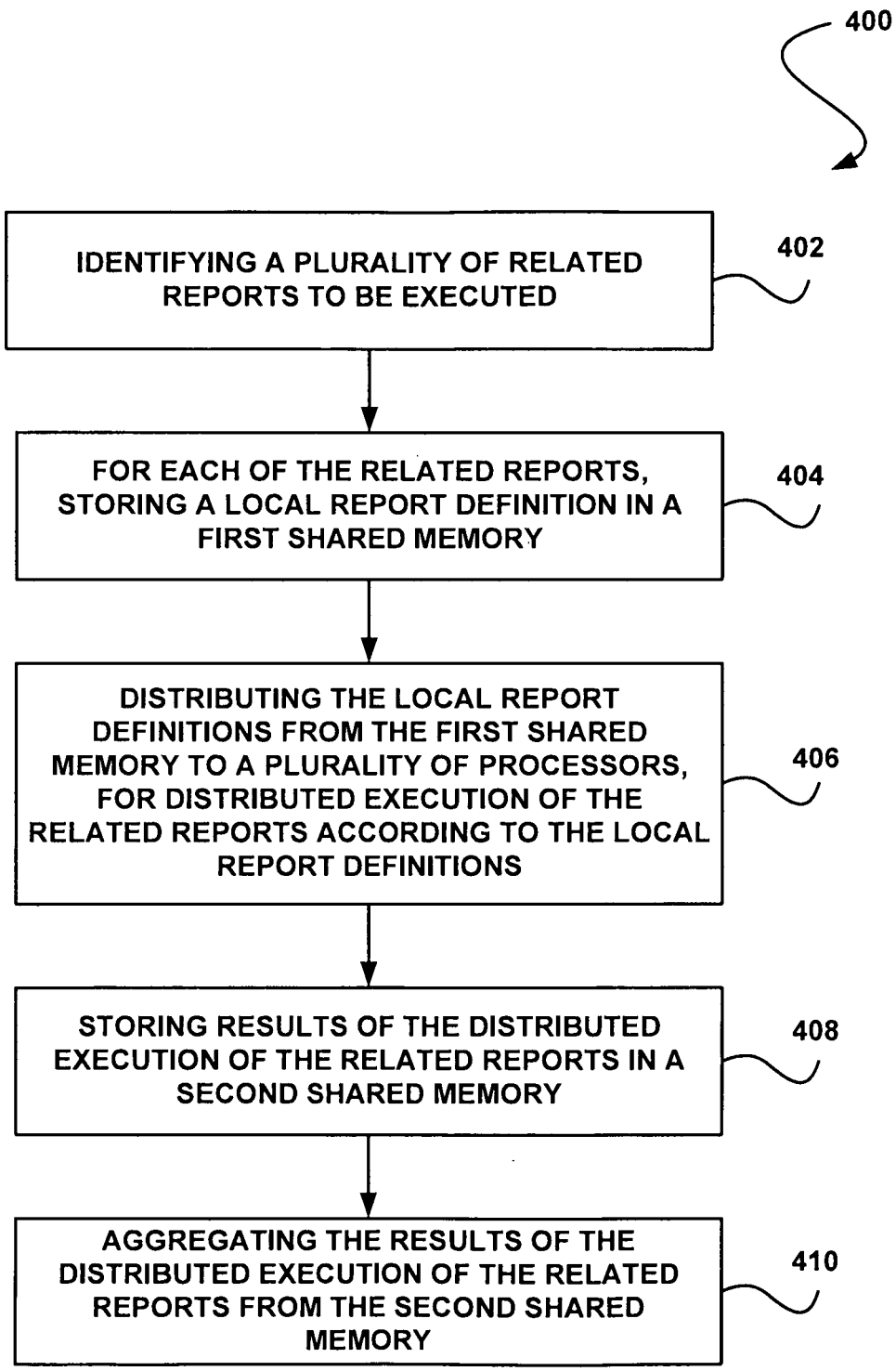
FIG. 4 illustrates a method for distributed execution of related reports, in accordance with an embodiment.

FIG. 4 illustrates a method 400 for distributed execution of related reports, in accordance with an embodiment. As an option, the method 400 may be carried out in the context of the details of FIGS. 1-3C. For example, the method 400 may be carried in association with operation 108 of FIG. 1. Of course, however, the method 400 may be carried out in any desired environment. Again, the aforementioned definitions may equally apply to the description below.

As shown in operation 402, a plurality of related reports to be executed is identified. As an option, the related reports to be executed may be identified in a manner similar to that described above with respect to operation 102 of FIG. 1. For example, the related reports may be identified from (e.g. and in response to) a request for a composite report defined using the related reports.

For each of the related reports, a local report definition is stored in a first shared memory. Note operation 404. Thus, the local report definition for each of the related reports may be stored in the first shared memory in response to the request for the composite report. In one embodiment, the first shared memory may be a queue. For reasons set forth below, the queue may be shared by multiple processors (e.g. hardware processors on different servers, or other computing devices), for example, of the multi-tenant on-demand database system.

In one embodiment, the local report definitions of the related reports may be determined using the replication described above with respect to FIG. 1. In another embodiment, the local report definitions may be determined by a processor that received the request for the composite report. Thus, the determined local report definitions may optionally be stored in the first shared memory by the processor that received the request for the composite report.

Additionally, as shown in operation 406, the local report definitions are distributed from the first shared memory to a plurality of processors, for distributed execution of the related reports according to the local report definitions. It should be noted that the local report definitions may be distributed in accordance with any desired criteria. In one embodiment, the local report definitions may be distributed from the first shared memory based on available capacities of the processors.

For example, the local report definitions may be distributed to the processors by each of the processors retrieving at least one of the local report definitions from the first shared memory. Each of the processors may optionally retrieve a local report definition in response to a determination by the processor that a capacity of the processor is available to execute the related report associated with the local report definition. In this way, only processors having a processing capacity to execute one of the related reports may retrieve a local report definition of the related report for use in executing the related report.

Further, as shown in operation 408, results of the distributed execution of the related reports are stored in a second shared memory. The second shared memory may include any memory (e.g. volatile) separate from the first shared memory that is also shared by at least the processors. For example, the second shared memory may be shared by the processors capable of being utilized for executing the related reports and at least the processor which stored the local report definitions in the first shared memory for distribution of such other processors executing related reports in parallel.

In one embodiment, in response to one of the distributed processors completing execution of a related report, results of such execution may be stored in the second shared memory by such processor. Thus, each of the processors may generate results of an execution of at least one of the related reports performed by the processor, and store the results in the second shared memory. As an option, each processor may convert the results it generates from first format of the results (e.g. specific to an environment of the processor) to a second format, and store the results having the second format in the second shared memory. In this way, the second shared memory may store results generated by a plurality of processors optionally operating in different environments, where all of the stored results are in a common format.

The results of the distributed execution of the related reports are then aggregated from the second shared memory, as shown in operation 410. The aggregation may be performed in any desired manner, for example, to form the requested composite report. In one embodiment, the aggregation may be performed as described above with respect to operation 110 of FIG. 1. As an option, the results of the distributed execution of the related reports may be retrieved from the second shared memory for aggregation the same. The results may optionally be retrieved by a processor that stored the local report definition for each of the related reports in the first shared memory (e.g. the processor that received the request for the composite report). As a further option, the results may be retrieved by the processor in response to a determination that results of execution of all of the related reports are stored in the second shared memory, such that the processor retrieves all of the results at one time. By distributing execution of the related reports (e.g. when a composite report encompassing the related reports is requested), the related reports may be executed in parallel and performance related to the executions may be enhanced.

Figure 5:
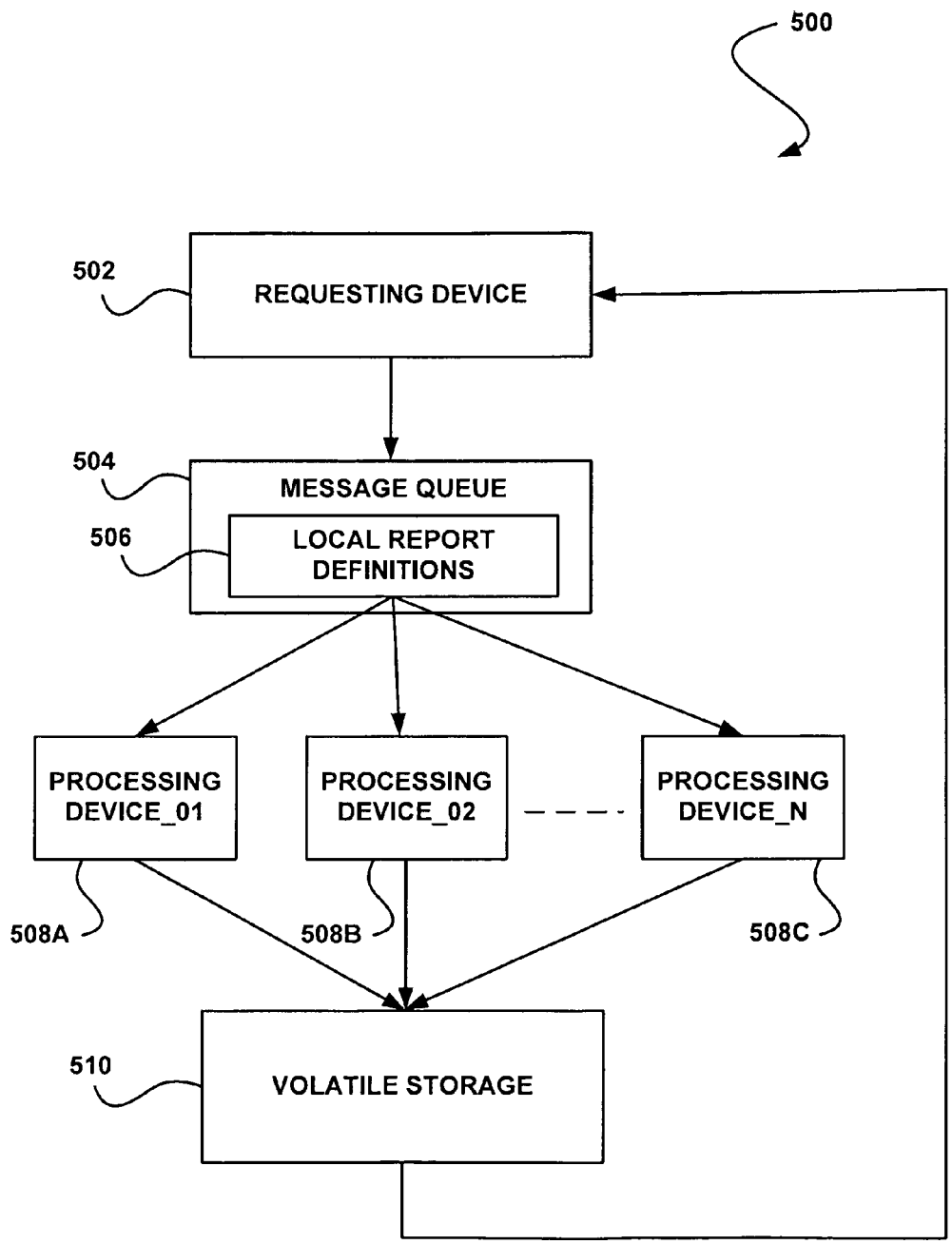
FIG. 5 illustrates a system for distributed execution of related reports, in accordance with an embodiment.

FIG. 5 illustrates a system 500 for distributed execution of related reports, in accordance with an embodiment. As an option, the system 500 may be implemented in the context of the details of FIGS. 1-4. For example, the system 500 may be implemented to carry out the method 400 of FIG. 4. As another example, the system 500 may be implemented in a multi-tenant on-demand database system. Of course, however, the system 500 may be implemented in any desired environment. Again, the aforementioned definitions may equally apply to the description below.

As shown, a requesting device 502 is in communication with a message queue 504. The requesting device 502 may be a processor, server, etc. The requesting device 502 receives a request to execute a composite report, for example, from a client device (not shown) of a user. The requesting device 502 identifies a plurality of related reports from the requested composite report and updates local report definitions for the related reports using a global report definition of the composite report. The requesting device 502 then stores the updated local report definitions in the message queue 504 (stored updated local report definitions shown as 506).

Multiple distributed processing devices 508A-N share the message queue 504, as shown. As each processing device 508A-N determines it has a processing capacity to execute one of the related reports defined by a local report definition 506 stored in the message queue 504, the processing device 508A-N retrieves the local report definition 506 from the message queue 504 and executes the associated related report defined by the retrieved local report definition 506.

Figure 8:
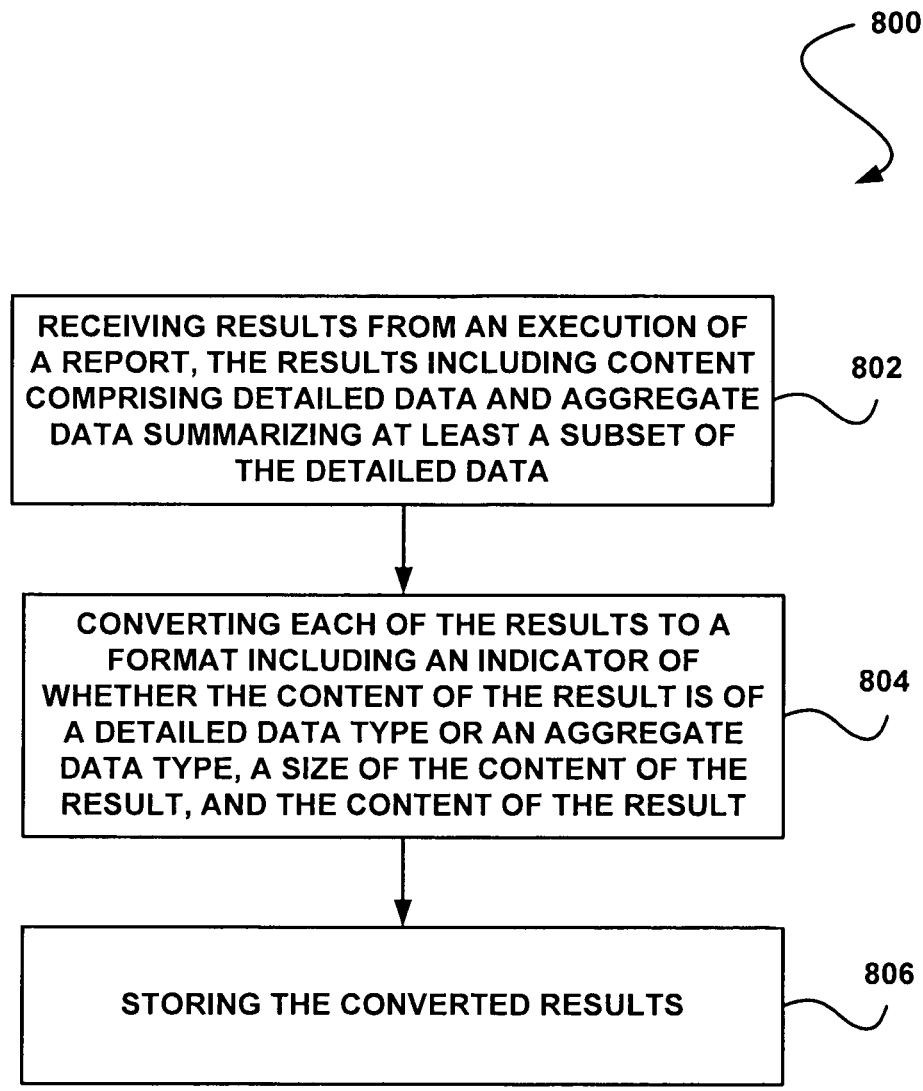
FIG. 8 illustrates a method for converting a format of report results, in accordance with an embodiment.

Results of the executed related report are stored in volatile storage 510, by the processing device 508A-N that performed the execution. Thus, results of execution of all of the related reports are stored in the volatile storage 510. As an option, the processing device 508A-N may convert the results to a common format, prior to storing the same in the volatile storage 510, the reasons for which will be set forth below in more detail. FIG. 8 describes one example of the common format to which the results may be converted.

The requesting device 502 then retrieves the results from the volatile storage 510 for aggregating the same to form the composite report results. Upon retrieval of the results from the volatile storage 510, the results may be removed from the volatile storage 510. In one embodiment, the requesting device 502 may retrieve all of the results of the executed related reports at one time.

For example, the requesting device 502 may periodically check a status of the execution of the related reports (e.g. using a tracking identifier assigned to the local report definitions 506 stored in the message queue 504). As an option, each of the processing devices 508A-N may store in a database a status of completion of execution of a related report, and the requesting device 502 may periodically check the status by querying the database for the status). The requesting device 502 may then only retrieve the results from the volatile storage 510 when the database indicates that execution of all of the related reports has completed.

The requesting device 502 may retrieve the results from the volatile storage 510 in any desired manner. In one embodiment, the requesting device 502 may use the common format of the results, as described above, to retrieve the results according to a particular method, for example, as described below with respect to FIG. 9. The aggregation may be an automatic result of the manner in which the results are retrieved.

Figure 6:
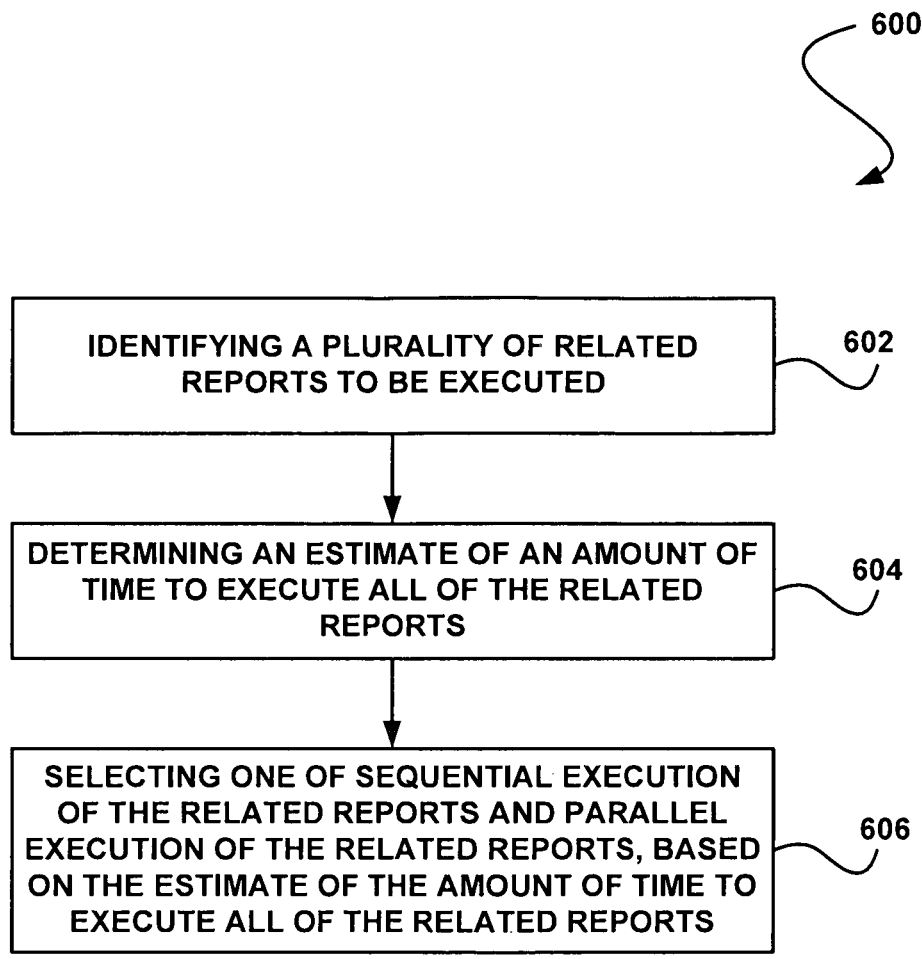
FIG. 6 illustrates a method for conditionally executing related reports in parallel based on an estimated execution time, in accordance with an embodiment.

FIG. 6 illustrates a method 600 for conditionally executing related reports in parallel based on an estimated execution time, in accordance with an embodiment. As an option, the method 600 may be carried out in the context of the details of FIGS. 1-5. For example, the method 600 may be carried in association with operation 406 of FIG. 4, for conditionally avoiding the distribution of the related report executions. Of course, however, the method 600 may be carried out in any desired environment. Again, the aforementioned definitions may equally apply to the description below.

As shown in operation 602, a plurality of related reports to be executed is identified. Such related reports may be identified as described above in the context of operation 102 of FIG. 1. For example, related reports may be identified with respect to a request for a composite report.

Additionally, as shown in operation 604, an estimate of an amount of time to execute all of the related reports is determined. Such estimate may include any approximated amount of time that it is believes the related reports will take to execute. Thus, the estimate is determined prior to execution of the related reports identified in operation 502.

In one embodiment, the estimate of the amount of time to execute all of the related reports may be determined from a sub-estimate of an amount of time to execute each of the related reports (e.g. by summing the sub-estimates, etc.). It should be noted that such estimate/sub-estimates may be determined in any desired manner.

The estimate may be determined for each of the related reports using historical data (e.g. amounts of time taken to previously execute the related reports, etc.). As another option, the sub-estimate may be determined for each of the related reports using statistics. Such statistics may be determined from the historical data. As another option, the sub-estimate may be determined for each of the related reports based on bandwidth of a processing source receiving a request for execution of the related reports (e.g. such as a bandwidth of the requesting device 502 of FIG. 5).

As yet another option, the sub-estimate may be determined for each of the related reports based on a code source requesting execution of the related reports. In one embodiment, if the code source is a user interface (e.g. via which execution of the related reports is requested by a user), the sub-estimate may be different (e.g. less time) than if the code source is an application. For example, it may be assumed that a user would be requesting a lesser amount of data from the execution of the related reports than would an application. Similarly, the sub-estimate may be determined for each of the related reports based on an amount of data included in results forecasted for the related report.

Further, sequential execution of the related reports or parallel execution of the related reports is selected, based on the estimate of the amount of time to execute all of the related reports. Note operation 606. In the present embodiment, the parallel execution may include the distributed execution described above with respect to FIG. 4. Thus, the parallel execution may utilize multiple processors (e.g. items 508A-N of FIG. 5) which retrieve from shared memory local report definitions associated with the related reports for use in execution of the related reports.

Also in the present embodiment, the sequential execution may include execution of all of the related reports by a single processor (e.g. the requesting device 502 of FIG. 5). Thus, sequential execution may optionally avoid the overhead otherwise associated with the parallel execution, such as the storing of the local report definitions in the shared memory for retrieval by distributed processors, the storing of results of the related report executions in other shared memory, and the periodic status checking for the stored results, as described above with respect to the operations of FIG. 4.

In one embodiment, the selection may be based on a comparison of the estimate of the amount of time to execute all of the related reports to a predefined threshold. For example, the sequential execution of the related reports may be selected in response to a determination that the estimate of the amount of time to execute all of the related reports is less than the predefined threshold. As mentioned above, the sequential execution of the related reports may be performed by a processing source receiving a request for execution of the related reports.

In another example, the parallel execution of the related reports may be selected in response to a determination that the estimate of the amount of time to execute all of the related reports is more than the predefined threshold. As mentioned above, the parallel execution of the related reports may be performed by a plurality of distributed processors. For example, execution of the related reports may be distributed across the processors, such that each of the processors executes a different one of the related reports. To this end, the distributed execution of related reports may be conditional based on an estimated amount of time to execute such related reports.

Figure 7:
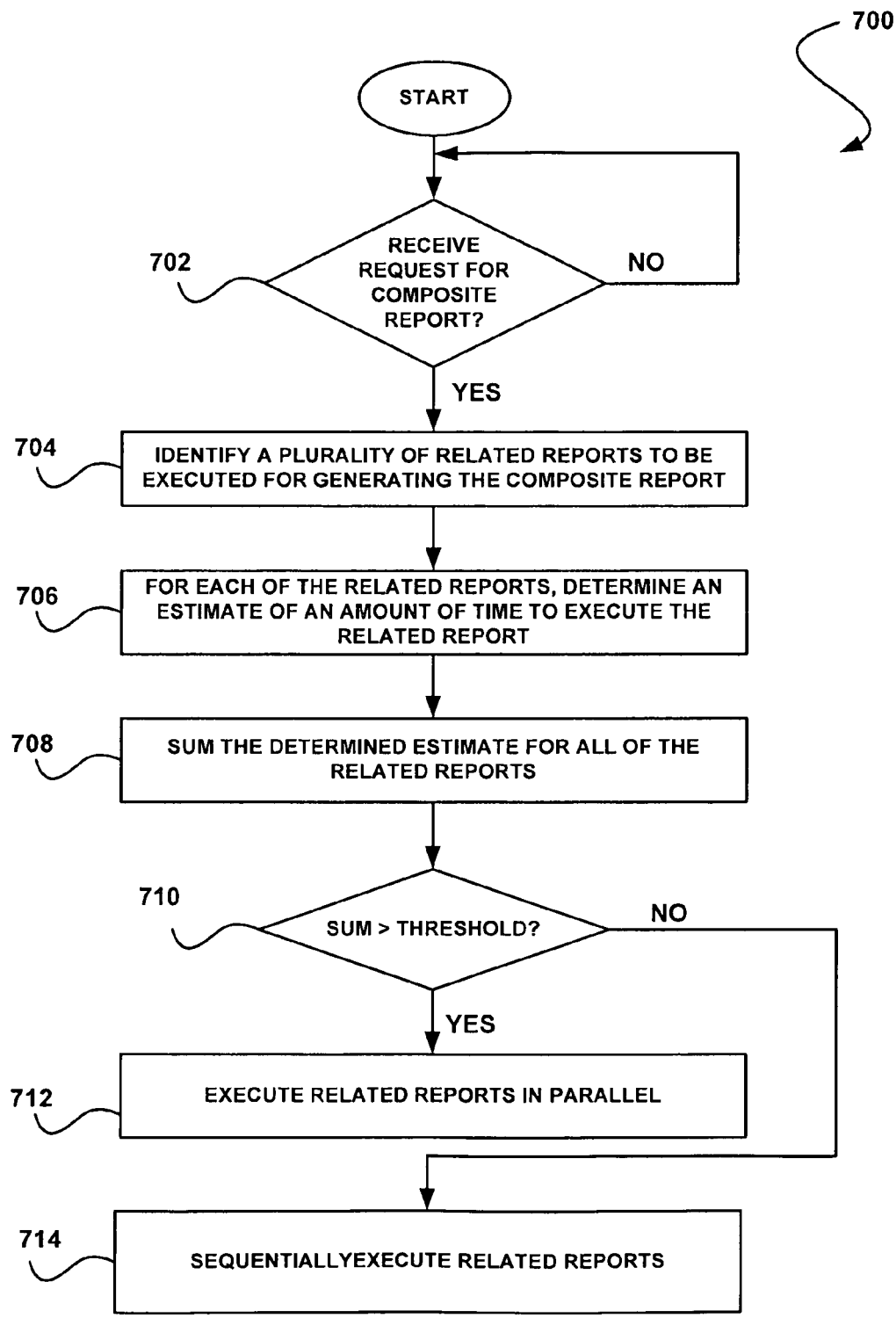
FIG. 7 illustrates a method for selecting between parallel and sequential execution of related reports, in accordance with an embodiment.

FIG. 7 illustrates a method 700 for selecting between parallel and sequential execution of related reports, in accordance with an embodiment. As an option, the method 700 may be carried out in the context of the details of FIGS. 1-6. Of course, however, the method 700 may be carried out in any desired environment. Again, the aforementioned definitions may equally apply to the description below.

As shown in decision 702, it is determined whether a request for a composite report is received. Such a request may be received from a user via a user interface, or from an application (e.g. without a user initiating the request). If it is determined that a request for a composite report is not received, the method 700 continues to wait for such a request.

However, in response to a determination that a request for a composite report is received, a plurality of related reports to be executed for generating the composite report is identified. Note operation 704. Further, for each of the related reports, an estimate of an amount of time to execute the related report is determined. The estimate may be determined based on historical data and/or statistic associated with time taken for previous executions of the related report, for example.

The determined estimate for all of the related reports is then summed, as shown in operation 708. Moreover, it is determined whether the sum is greater than a predefined threshold. Note decision 710. If it is determined that the sum is greater than (e.g. or equal to) the predefined threshold, the related reports are executed in parallel (i.e. by distributing the same across multiple processors). Note operation 712. If it is determined that the sum is not greater than the predefined threshold, the related reports are sequentially executed (e.g. by a single processor), as shown in operation 714.

FIG. 8 illustrates a method 800 for converting a format of report results, in accordance with an embodiment. As an option, the method 800 may be carried out in the context of the details of FIGS. 1-7. For example, the method 800 may be carried prior to operation 408 of FIG. 4, such that the report results are stored in the shared memory in a common format. Of course, however, the method 800 may be carried out in any desired environment. Again, the aforementioned definitions may equally apply to the description below.

As shown in operation 802, results from an execution of a report are received, where the results include content comprising detailed data and aggregate data summarizing at least a subset of the detailed data. In one embodiment, the report may include one of a plurality of related reports. Such related reports may be distributed across a plurality of processors for execution of the plurality of reports. Thus, results of the execution of the report may be received by the one of the processors executing the report.

It should be noted that the each of the received results may include a row of a table. Accordingly, the results may be received in a table format. For example, each row of the table may store either detailed data, or aggregate data summarizing a subset (or all) of the detailed data. It should be noted that the aggregate data may be defined by a local report definition defining the report and used to execute the report.

Additionally, each of the results is converted to a format including an indicator of whether the content of the result is of a detailed data type of an aggregate data type, a size of the content of the result, and the content of the result. Note operation 804. Such converted format may include a grouping format.

The grouping format may include, for each of a plurality of groups, storing results having detailed data to be immediately following a result having aggregate data summarizing the detailed data. As an option, each of the groups may be determined from a local report definition for the report. For example, as noted above, the aggregate data may be defined by the local report definition, such that a group represented by the aggregate data and including the detailed data summarized by the aggregate data may be determined from the local report definition.

As a further option, the groups may be ordered according to the local report definition. For example, the groups may be ordered alphabetically, numerically, etc.

Further, the converted results are stored, as shown in operation 806. Such converted results may be stored in shared memory (e.g. the volatile storage 510 of FIG. 5). Thus, in the context of the report being one of a plurality of related reports, the execution of which is distributed across multiple processors, the converted results may be stored with other converted results associated with execution of at least another one of the related reports.

The format to which the results are converted may be used for retrieving the results. In particular, the format to which the results are converted may be used for retrieving the results in an aggregated manner with respect to the other results from the other related report. For example, the converted results and the other converted results may be stored for retrieval by a single processor (e.g. the requesting device 502 of FIG. 5). More details describing one example of such a retrieval method will be described below with respect to FIG. 9.

Figure 9:
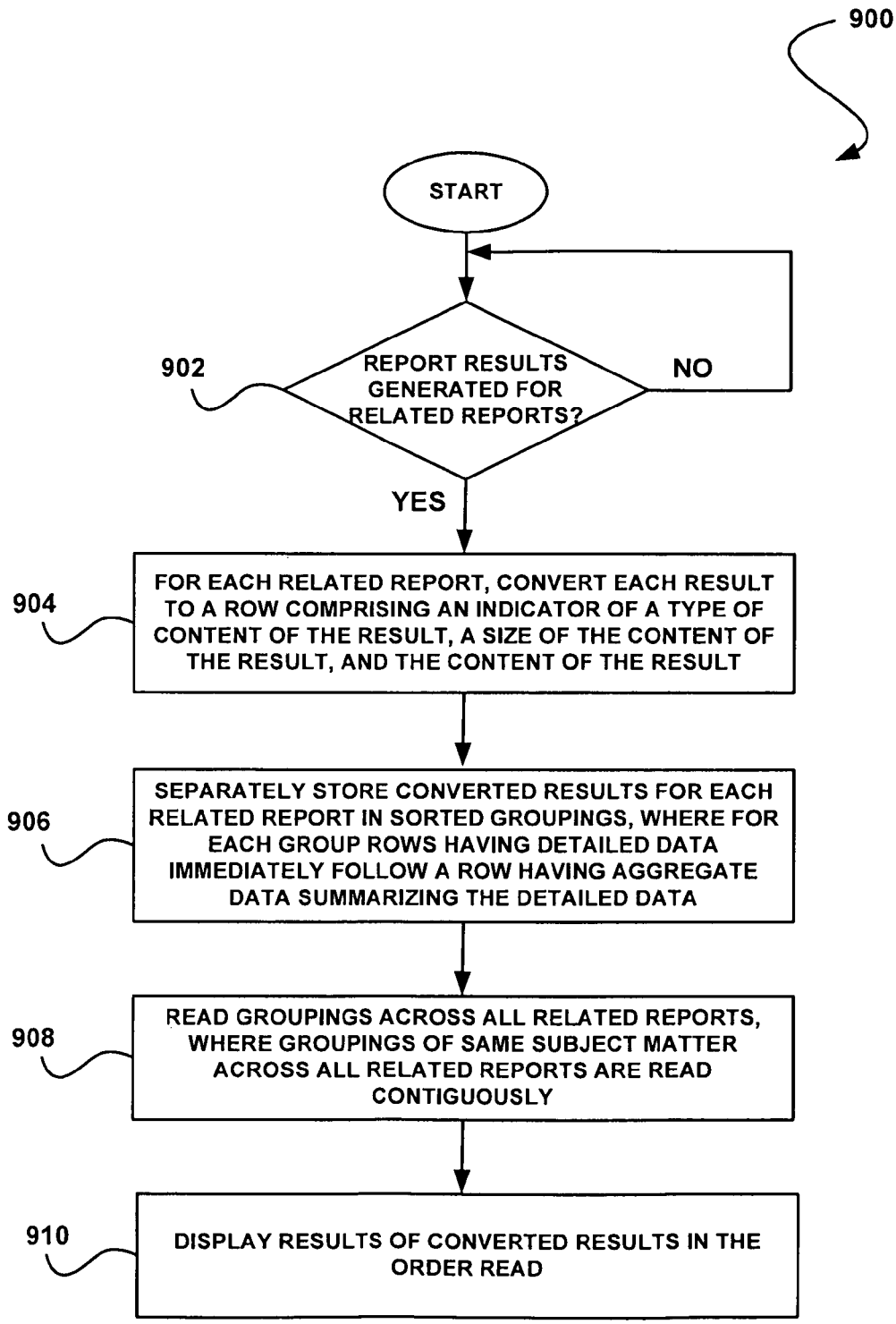
FIG. 9 illustrates a method for aggregating results of execution of related reports that have been converted in accordance with a predefined format, in accordance with an embodiment.

FIG. 9 illustrates a method 900 for aggregating results of execution of related reports that have been converted in accordance with a predefined format, in accordance with an embodiment. As an option, the method 900 may be carried out in the context of the details of FIGS. 1-8. Of course, however, the method 900 may be carried out in any desired environment. Again, the aforementioned definitions may equally apply to the description below.

As shown in decision 902, it is determined whether report results are generated for a plurality of related reports. Such report results may be generated by a plurality of distributed processors, each executing a different one of the related presorts. In the present embodiment, the report results may include content comprising detailed data and aggregate data summarizing at least a subset of the detailed data.

If it is determined that report results are not generated, the method 900 continues to wait for report results to be generated. Once it is determined that report results are generated, for each related report, each of the results is converted to a row comprising an indicator of a type of content of the result (e.g. detailed data or aggregate data), a size of the content of the result, and the content of the result. Note operation 904. Further, converted results for each related report are separately stored in sorted groupings (i.e. in memory, such as memory shared by the distribute processors), where for each group rows having detailed data immediately follow a row having aggregate data summarizing the detailed data. Note operation 906.

The manner in which the groupings are sorted may be defined by each local report definition associated with the related reports. For example, the local report definitions may have the defined sort order replicated from a global report definition (e.g. as described with respect to FIG. 1). Accordingly, the converted report results for each of the related reports may be sorted in a common manner.

Still yet, as shown in operation 908, groupings across all related reports are read, where groupings of a same subject matter across all related reports are read contiguously. Of course, it should be noted that while the retrieval of groupings is described in the present embodiment, in other embodiments only aggregate data, only detailed data, and/or only selected groupings may be retrieved, as desired by code source requesting results of the various related reports.

In one embodiment, a single processor may retrieve the converted results from each of the related reports using the grouping format, such that the retrieved converted results for the various related reports are aggregated by grouping (e.g. as defined in part by the content type indicator). As noted above, the single processor may retrieve the converted results from the various related reports using the grouping format by contiguously retrieving groups of a same subject matter across the converted results of the various related reports.

As an option, the groups of the same subject matter may be identified by placing a first pointer on a first one of the converted results of a first one of the related reports, placing a second pointer on a first one of other converted results of a second one of the related reports, reading the first one of the converted results using the first pointer, reading the first one of the other converted results using the second pointer, determining that the first one of the converted results is of an aggregate data type, determining that the first one of the other converted results is of an aggregate data type, and comparing a subject matter of the first one of the converted results and the first one of the other converted results to determine whether the group represented by the first one of the converted results is of a same subject matter as the group represented by the first one of the other converted results.

Moreover, the converted results are displayed in the order read, as shown in operation 910. In this way, the converted results across the various related reports may be aggregated by virtue of the order in which such converted results are read. Of course, it should be noted that the converted results may be provided to any code source requesting execution of the related reports in the above described order in which the converted results from the various related reports are retrieved.

As noted above, only a portion of the converted results across the various related reports may be retrieved using the grouping format. Such portion may include the aggregate data, the detailed data, and/or a subset of the groups, where the content type indicator and the content size may be used to retrieve only the exact content desired. By enabling the retrieval only portions of the results of the various related reports via the conversion into the grouping format, the results of the related reports may be used as desired by different applications, without those different applications having to necessarily retrieve all of the converted results.

Figure 10:
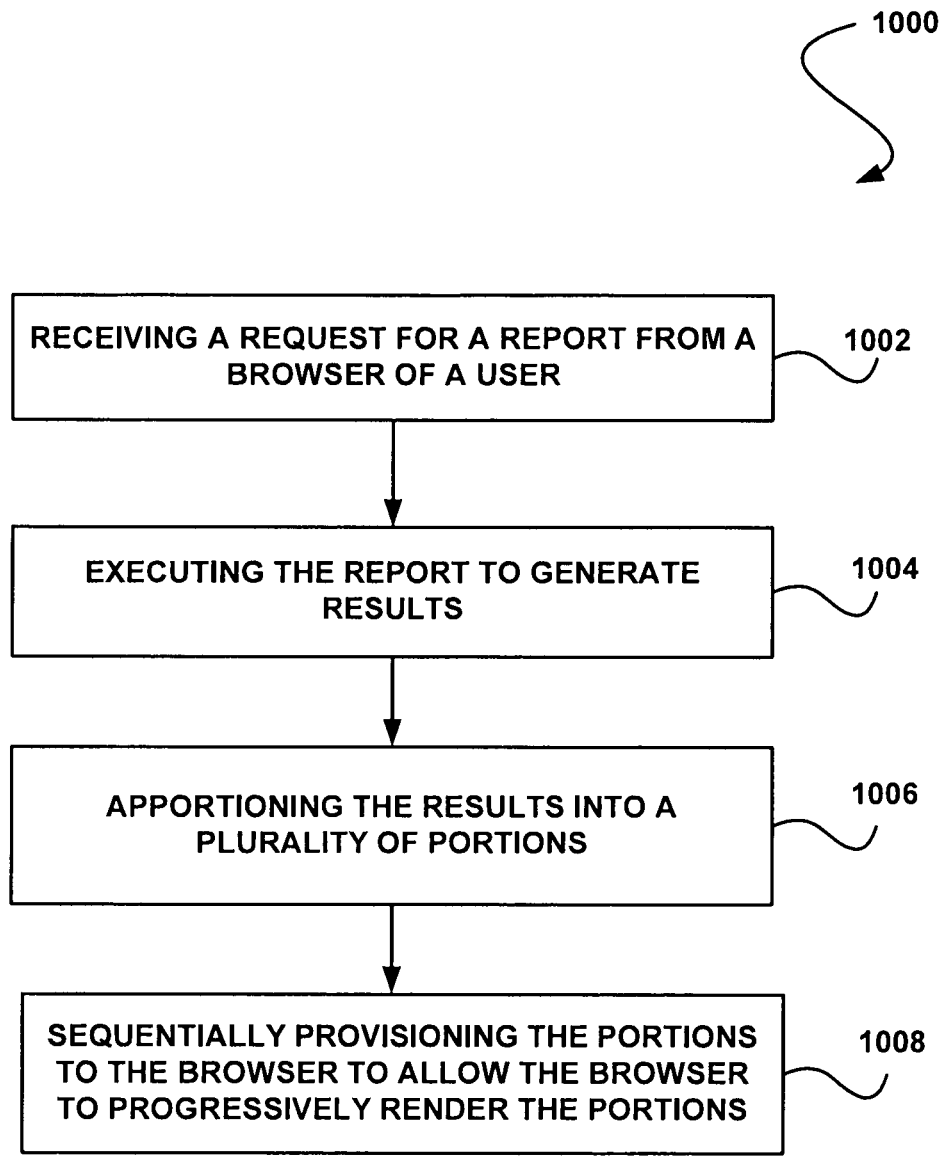
FIG. 10 illustrates a method for progressive rendering of report results, in accordance with an embodiment.

FIG. 10 illustrates a method 1000 for progressive rendering of report results, in accordance with an embodiment. As an option, the method 1000 may be carried out in the context of the details of FIGS. 1-9. For example, the method 1000 may be carried out in the context of operation 908 of FIG. 9 in which related report results are sent to a device requesting the related report results. Of course, however, the method 1000 may be carried out in any desired environment. Again, the aforementioned definitions may equally apply to the description below.

As shown in operation 1002, a request for a report is received from a browser of a user. In one embodiment, the request may be initiated by the user. For example, the request may be initiated via a user interface displayed on the browser. As an option, the report may include a composite report.

Additionally, as shown in operation 1004, the report is executed to generate results. The report may be executed according to a local report definition of the report. Where the report is a composite report, the report may be executed by individually executing a plurality of related reports forming the composite report. Accordingly, in the present embodiment, the results may include results from execution of all of the related reports. Such results may optionally be stored in memory (e.g. volatile memory 510 of FIG. 5).

In one embodiment, the results may be in a grouping format, such as the format described above with respect to FIGS. 8-9. Thus, the grouping format may group the results, for example, where each group includes detailed data and aggregate data summarizing the detailed data.

Further, as shown in operation 1006, the results are apportioned into a plurality of portions. In one embodiment where the results are in the grouping format, the results may be apportioned according to the groups. For example, each portion may be one of the groups. As another example, each portion may be a series of groups of a same subject matter generated from results of multiple of the related applications (i.e. aggregated groups as described above with respect to FIG. 9).

As another option, the results may include rows in a table where the results are apportioned by a number of rows. In this way, each portion may include the number of rows. Of course, it should be noted that the results may be apportioned in any desired manner which produces a plurality of portions each having a different subset of the results.

The portions are then provisioned to the browser to allow the browser to progressively render the portions, as shown in operation 1008. In the present embodiment, provisioning the portions to the browser may include individually sending the portions to the browser in a sequence. The sequence may be based on the sequence in which the portions are stored in the aforementioned memory. In addition, the results in each portion may be written in a format of the browser prior to being provisioned to the browser.

As an option, each portion may be removed from the memory in response to the provisioning of the portion to the browser. This may reduce an amount of the memory used for storing data. To this end, the browser may receive the results of the execution of the report in multiple portions, such that the browser may automatically render the results on a portion by portion basis.

Figure 11:
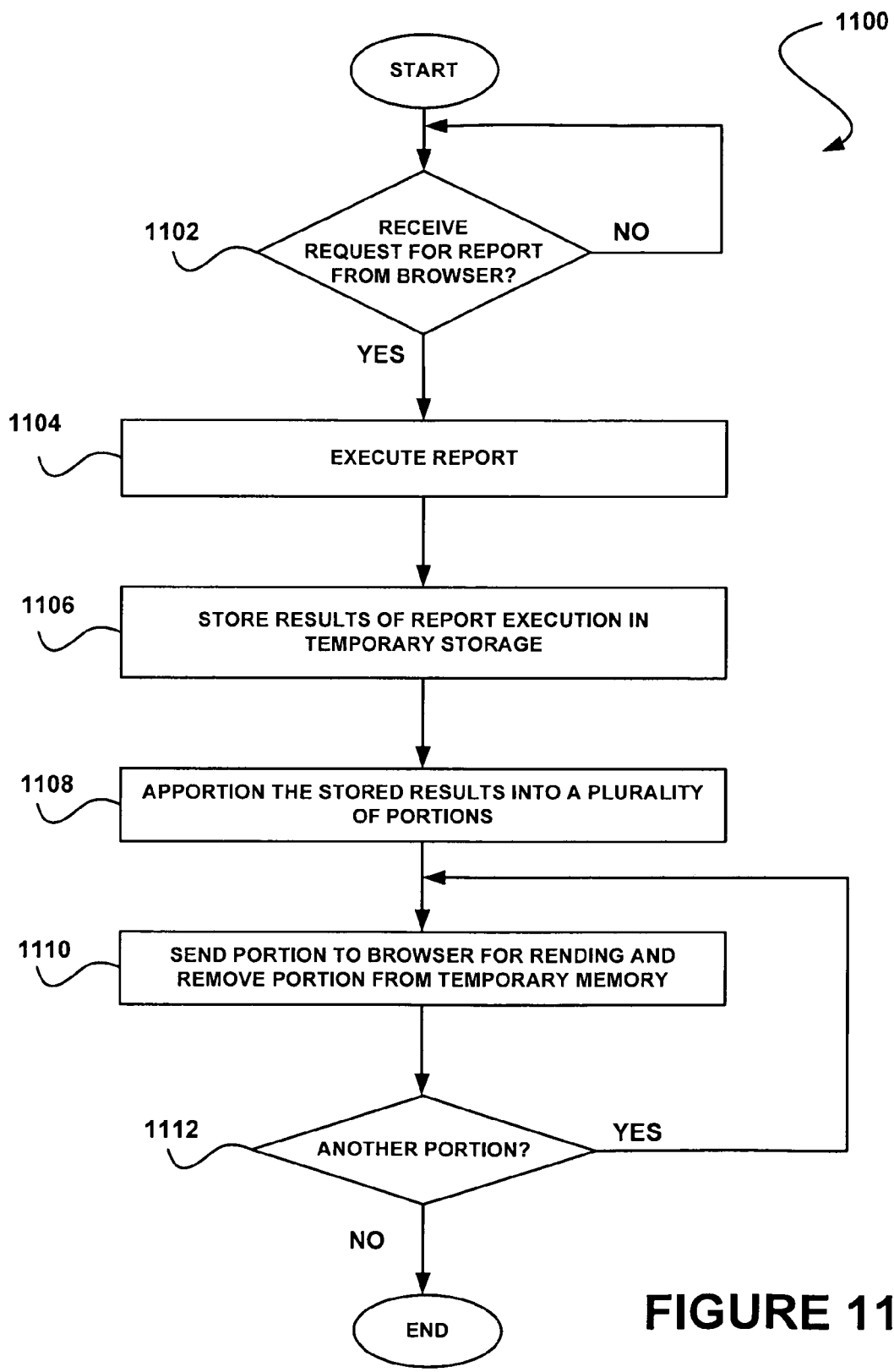
FIG. 11 illustrates a method for apportioning report results for progressively rendering the report results, in accordance with an embodiment.

FIG. 11 illustrates a method 1100 for apportioning report results for progressively rendering the report results, in accordance with an embodiment. As an option, the method 1100 may be carried out in the context of the details of FIGS. 1-10. Of course, however, the method 1100 may be carried out in any desired environment. Again, the aforementioned definitions may equally apply to the description below.

As shown in decision 1102, it is determined whether a request for a report is received from a browser. If it is determined that a request for a report is not received from a browser, the method 1100 continues to wait for receipt of such a request. Once it is determined that a request for a report is received from a browser, the report is executed, as shown in operation 1104.

Results of the report execution are then stored in temporary storage, as shown in operation 1106. The stored results are further apportioned into a plurality of portions, as shown in operation 1108. Such apportioning may be performed based on a grouping format of the results, as an option. As another option, where the results include results from execution of multiple related reports forming the requested report, the apportioning may be performed once all of the related report results are stored in the temporary storage. This may ensure that the groupings may be aggregated across all of the related report results, and apportioned by aggregated grouping.

A first portion is sent to the browser for rendering and the portion is removed from the temporary memory. Note operation 1110. It is then determined whether another portion exists in the temporary memory (decision 1112). If it is determined that another portion does exist in the temporary memory, the method 1110 again sends the other portion to the browser for rendering and the other portion is removed from the temporary memory (operation 1110). This may be repeated until all portions are sent to the browser for rendering. Once it is determined in decision 1112 that all portions have been sent to the browser for rendering, the method 1100 terminates.

In one embodiment, the browser may employ multiple windows for receiving and rendering the report results portions, for example, as described in more detail below with respect to FIG. 12. In another embodiment, the column widths to be used for rendering the report results may be provided to the browser for use when progressively rendering the report results, for example, as described in more detail below with respect to FIG. 13.

Figure 12:
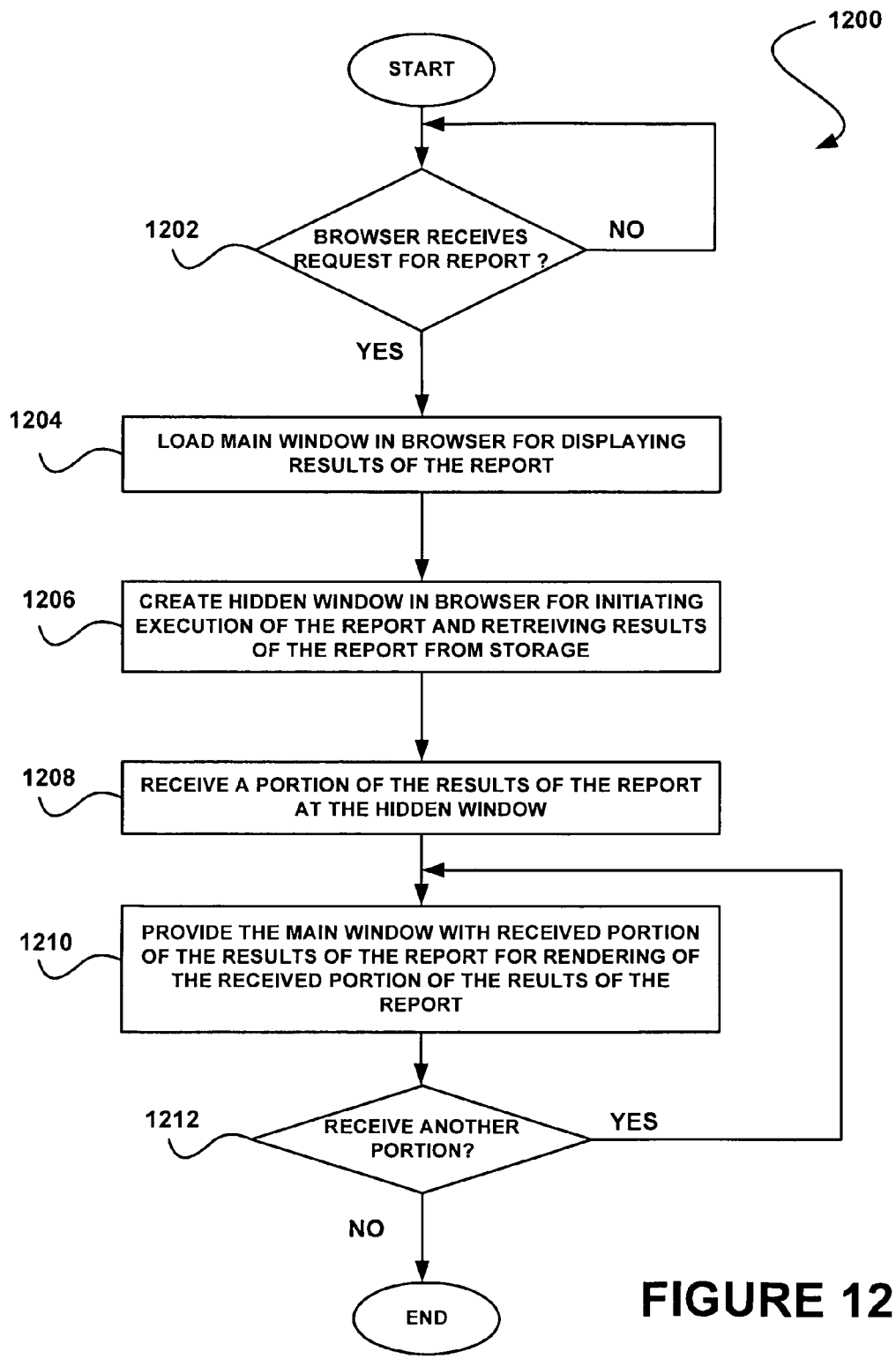
FIG. 12 illustrates a method for progressive rendering of report results using multiple browser windows, in accordance with an embodiment.

FIG. 12 illustrates a method 1200 for progressive rendering of report results using multiple browser windows, in accordance with an embodiment. As an option, the method 1200 may be carried out in the context of the details of FIGS. 1-11. Of course, however, the method 1200 may be carried out in any desired environment. Again, the aforementioned definitions may equally apply to the description below.

As shown in operation 1202, it is determined whether a browser receives a request for a report. The request may be received from a user via a window of the browser, for example. If it is determined that the browser has not received a request for a report, the method 1200 continues to wait for receipt of such a request.

Once it is determined that the browser receives a request for a report, a main window is loaded in the browser for displaying results of the report. Note operation 1204. The main window may be visible to the user, such that the user is capable of viewing report results displayed in the window.

Further, as shown in operation 1206, a hidden window is created in the browser for initiating execution of the report and retrieving results of the report from storage. The hidden window may be a window of the browser that is not visible to the user, in one embodiment. For example, the hidden window may be an iframe. By creating the main window and the hidden window before the report is executed, the browser may display a page of the browser including the windows for optionally receiving user interactions via the main window even before execution of the report.

Thus, the hidden window initiates execution of the report by sending a request for the report execution to a database on which the report is run. Once the report is executed, a portion of the results of the report are received at the hidden window. Note operation 1208. As noted above with respect to FIGS. 10-11, the results may be apportioned and therefore received at the hidden window as individual portions. In one embodiment, the portion may be pushed to the hidden window, such that the hidden window may avoid polling memory storing the report results for retrieving the portion. As an option, once the portion is sent to the hidden window, the portion may be removed from the memory storing the report results.

Further, the main window is provided with the received portion of the report results for rending such portion, as shown in operation 1210. In particular, the main window may receive the portion of the report results from the hidden window. Thus, the main window may be used for receiving portions of reports results and provisioning the same to the main window for rendering thereof, without the hidden window necessarily performing any rendering operations on the report results.

It is then determined whether another portion of the report results has been received at the hidden window (decision 1212), such that for each portion of the report results sequentially received by the hidden window, the hidden window may sequentially provide the portions of the report results to the main window for progressively rendering the report results on a portion by portion basis.

Figure 13:
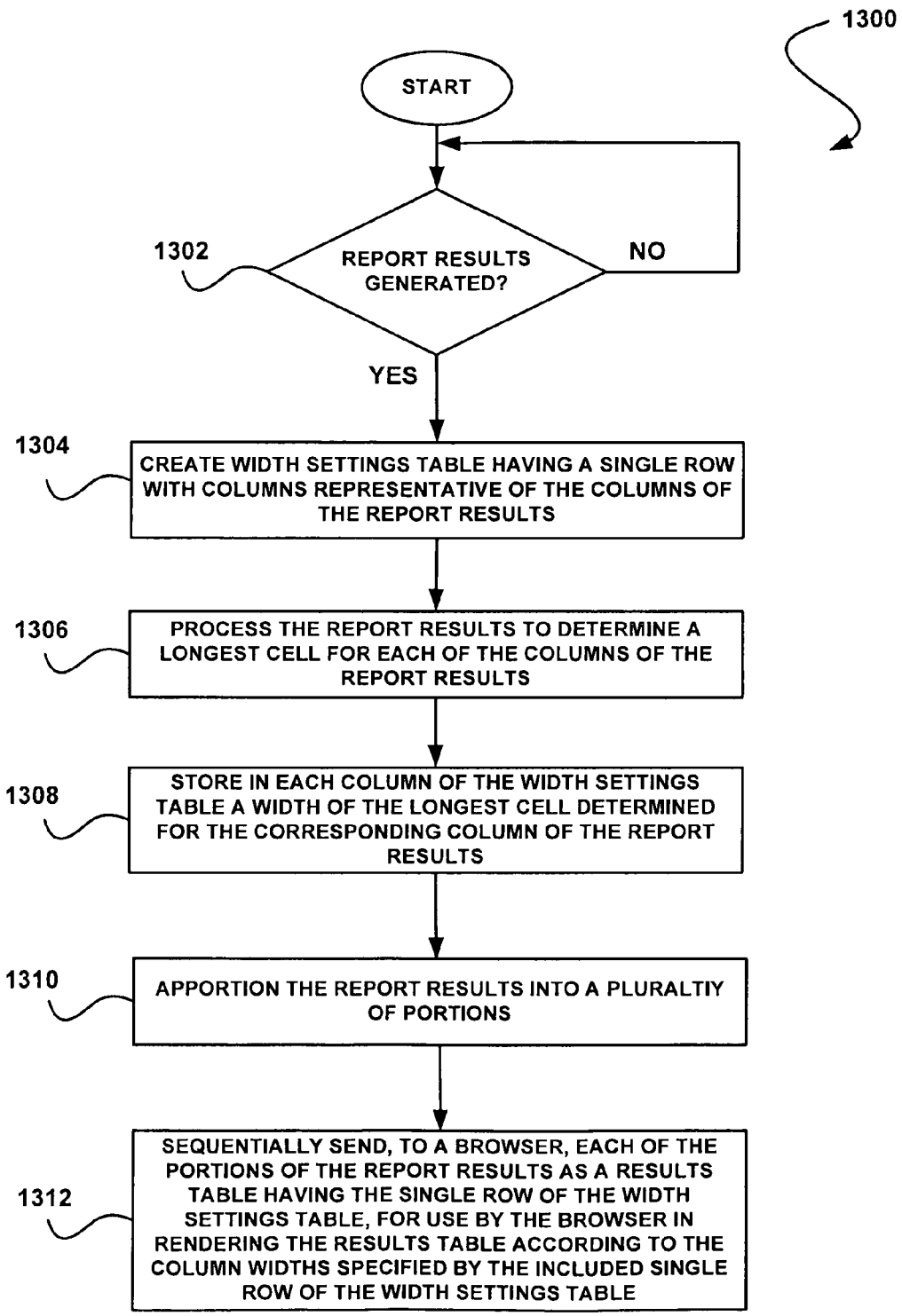
FIG. 13 illustrates a method for setting report column widths when progressively rendering report results, in accordance with an embodiment.

FIG. 13 illustrates a method 1300 for setting report column widths when progressively rendering report results, in accordance with an embodiment. As an option, the method 1300 may be carried out in the context of the details of FIGS. 1-12. Of course, however, the method 1300 may be carried out in any desired environment. Again, the aforementioned definitions may equally apply to the description below.

As shown in decision 1302, it is determined whether report results have been generated. If it is determined that report results have not been generated, the method 1400 waits for report results to be generated. As an option, operation 1302 may include both the generation and the storage (e.g. in shared memory) of such report results.

If it is determined that report results have been generated, a width settings table is created, where the width settings table has a single row with columns representative of the columns of the report results. Note operation 1304. Thus, the width settings table may have the same columns as included in the report results. FIG. 14A shows one example of a width settings table that may be created in operation 1304.

The report results are processed to determine a longest cell for each of the columns of the report results, as shown in operation 1306. Such processing may include any algorithm capable of being used for determining a longest cell included in each of the columns of the report results. In one embodiment, each cell of each column may be looped through to determine a single cell having the longest length. In another embodiment, a predetermined number of cells for each column having the longest widths may be determined and used as a basis for determining an approximation of a longest cell for the column (e.g. to account for any variance in length caused by variable width fonts).

In each column of the width settings table, a width of the determined longest cell for the corresponding column of the report results is stored. Note operation 1308. Further, the report results are apportioned into a plurality of portions (operation 1310), and the portions are sequentially sent to a browser for progressive rendering thereof, where each of the portions is sent as a table having the single row of the width settings table (operation 1312). The browser may then use the widths specified by the width settings table in rendering the results table (operation 1312).

FIG. 14B shows an exemplary header to be rendered as a header of the results table, which may also be sent to the browser with the single row of the width settings table. FIG. 14C-D show examples of the report results portions sent to the browser with the single row of the width settings table.

By setting the column widths to be used by the browser prior to sending the report results to the browser, the browser may be provided with the column widths to use in rendering the portions of the report results. This may reduce processing performed by the browser in rendering the report results, and thus any delay in rendering otherwise occurring on the part of the browser for the calculation of the column widths. In addition, since the report results are rendered by the browser in a sequence of portions, providing the column widths with each of the portions may prevent the browser from resizing the column widths on a portion by portion basis.

System Overview

Figure 15:
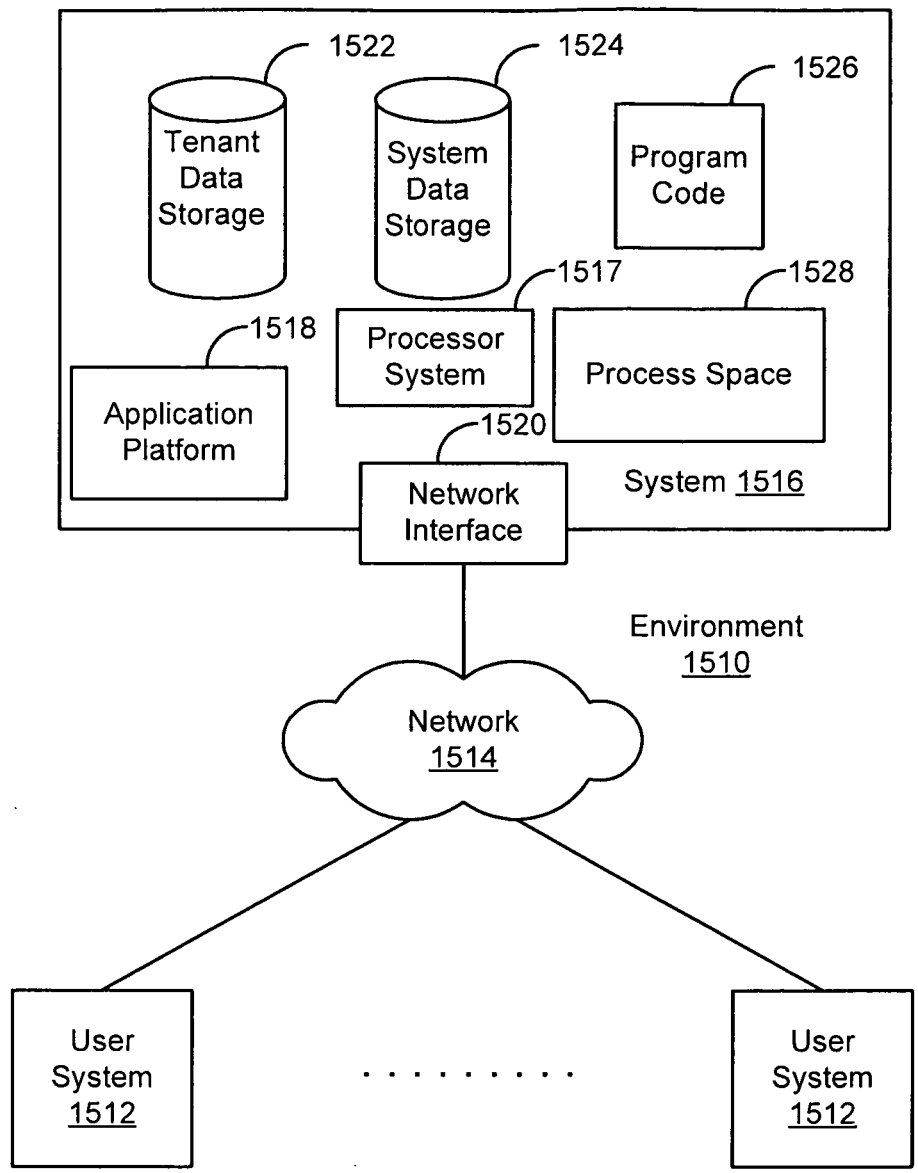
FIG. 15 illustrates a block diagram of an example of an environment wherein an on-demand database service might be used.

FIG. 15 illustrates a block diagram of an environment 1510 wherein an on-demand database service might be used. Environment 1510 may include user systems 1512, network 1514, system 1516, processor system 1517, application platform 1518, network interface 1520, tenant data storage 1522, system data storage 1524, program code 1526, and process space 1528. In other embodiments, environment 1510 may not have all of the components listed and/or may have other elements instead of, or in addition to, those listed above.

Environment 1510 is an environment in which an on-demand database service exists. User system 1512 may be any machine or system that is used by a user to access a database user system. For example, any of user systems 1512 can be a handheld computing device, a mobile phone, a laptop computer, a work station, and/or a network of computing devices. As illustrated in FIG. 15 (and in more detail in FIG. 16) user systems 1512 might interact via a network 1514 with an on-demand database service, which is system 1516.

An on-demand database service, such as system 1516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1516" and "system 1516" will be used interchangeably herein. A database image may include one or more database objects. A relational database management system (RDMS) or the equivalent may execute storage and retrieval of information against the database object(s). Application platform 1518 may be a framework that allows the applications of system 1516 to run, such as the hardware and/or software, e.g., the operating system. In an embodiment, on-demand database service 1516 may include an application platform 1518 that enables creation, managing and executing one or more applications developed by the provider of the on-demand database service, users accessing the on-demand database service via user systems 1512, or third party application developers accessing the on-demand database service via user systems 1512.

The users of user systems 1512 may differ in their respective capacities, and the capacity of a particular user system 1512 might be entirely determined by permissions (permission levels) for the current user. For example, where a salesperson is using a particular user system 1512 to interact with system 1516, that user system has the capacities allotted to that salesperson. However, while an administrator is using that user system to interact with system 1516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1514 is any network or combination of networks of devices that communicate with one another. For example, network 1514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 1512 might communicate with system 1516 using TCP/IP and, at a higher network level, use other common Internet protocols to communicate, such as HTTP, FTP, AFS, WAP, etc. In an example where HTTP is used, user system 1512 might include an HTTP client commonly referred to as a "browser" for sending and receiving HTTP messages to and from an HTTP server at system 1516. Such an HTTP server might be implemented as the sole network interface between system 1516 and network 1514, but other techniques might be used as well or instead. In some implementations, the interface between system 1516 and network 1514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1516, shown in FIG. 15, implements a web-based customer relationship management (CRM) system. For example, in one embodiment, system 1516 includes application servers configured to implement and execute CRM software applications as well as provide related data, code, forms, webpages and other information to and from user systems 1512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1516 implements applications other than, or in addition to, a CRM application. For example, system 1516 may provide tenant access to multiple hosted (standard and custom) applications, including a CRM application. User (or third party developer) applications, which may or may not include CRM, may be supported by the application platform 1518, which manages creation, storage of the applications into one or more database objects and executing of the applications in a virtual machine in the process space of the system 1516.

One arrangement for elements of system 1516 is shown in FIG. 15, including a network interface 1520, application platform 1518, tenant data storage 1522 for tenant data 1523, system data storage 1524 for system data 1525 accessible to system 1516 and possibly multiple tenants, program code

1526 for implementing various functions of system 1516, and a process space 1528 for executing MTS system processes and tenant-specific processes, such as running applications as part of an application hosting service. Additional processes that may execute on system 1516 include database indexing processes.

Several elements in the system shown in FIG. 15 include conventional, well-known elements that are explained only briefly here. For example, each user system 1512 could include a desktop personal computer, workstation, laptop, PDA, cell phone, or any wireless access protocol (WAP) enabled device or any other computing device capable of interfacing directly or indirectly to the Internet or other network connection. User system 1512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 1512 to access, process and view information, pages and applications available to it from system 1516 over network 1514. Each user system 1512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1516 or other systems or servers. For example, the user interface device can be used to access data and applications hosted by system 1516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1512 and all of its components are operator configurable using applications, such as a browser, including computer code run using a central processing unit such as an Intel Pentium® processor or the like. Similarly, system 1516 (and additional instances of an MTS, where more than one is present) and all of their components might be operator configurable using application(s) including computer code to run using a central processing unit such as processor system 1517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 1516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 1516 is configured to provide webpages, forms, applications, data and media content to user (client) systems 1512 to support the access by user systems 1512 as tenants of system 1516. As such, system 1516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 16:
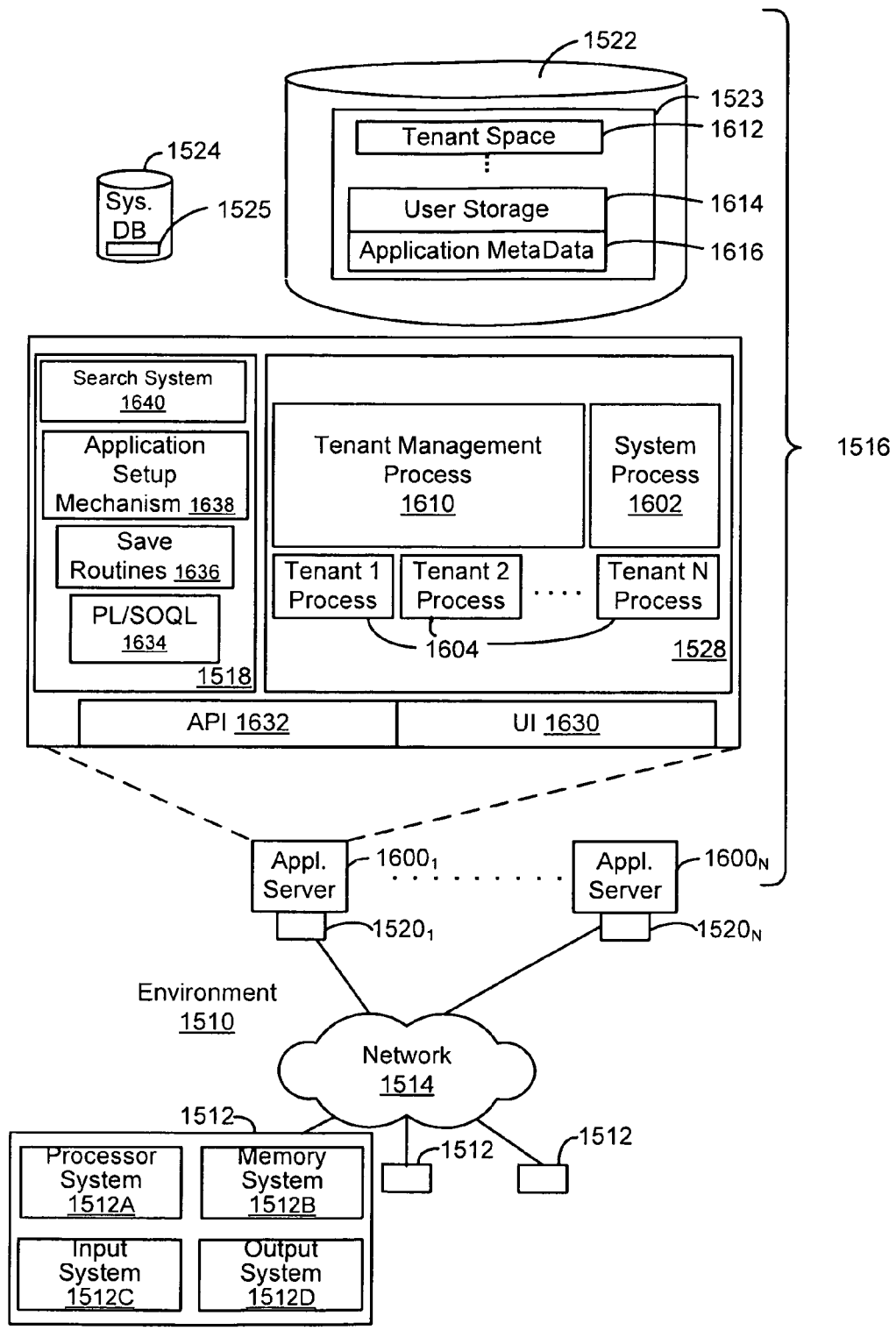
FIG. 16 illustrates a block diagram of an embodiment of elements of FIG. 15 and various possible interconnections between these elements.

FIG. 16 also illustrates environment 1510. However, in FIG. 16 elements of system 1516 and various interconnections in an embodiment are further illustrated. FIG. 16 shows that user system 1512 may include processor system 1512A, memory system 15123B, input system 1512C, and output system 1512D. FIG. 16 shows network 1514 and system 1516. FIG. 16 also shows that system 1516 may include tenant data storage 1522, tenant data 1523, system data storage 1524, system data 1525. User Interface (UI) 1630, Application Program Interface (API) 1632, PL/SOQL 1634, save routines 1636, application setup mechanism 1638, applications servers 1600$_1$-1600$_N$, system process space 1602, tenant process spaces 1604, tenant management process space 1610, tenant storage area 1612, user storage 1614, and application metadata 1616. In other embodiments, environment 1510 may not have the same elements as those listed above and/or may have other elements instead of, or in addition to, those listed above.

User system 1512, network 1514, system 1516, tenant data storage 1522, and system data storage 1524 were discussed above in FIG. 15. Regarding user system 1512, processor system 1512A may be any combination of one or more processors. Memory system 1512B may be any combination of one or more memory devices, short term, and/or long term memory. Input system 1512C may be any combination of input devices, such as one or more keyboards, mice, trackballs, scanners, cameras, and/or interfaces to networks. Output system 1512D may be any combination of output devices, such as one or more monitors, printers, and/or interfaces to networks. As shown by FIG. 16, system 1516 may include a network interface 1520 (of FIG. 15) implemented as a set of HTTP application servers 1600, an application platform 1518, tenant data storage 1522, and system data storage 1524. Also shown is system process space 1602, including individual tenant process spaces 1604 and a tenant management process space 1610. Each application server 1600 may be configured to tenant data storage 1522 and the tenant data 1523 therein, and system data storage 1524 and the system data 1525 therein to serve requests of user systems 1512. The tenant data 1523 might be divided into individual tenant storage areas 1612, which can be either a physical arrangement and/or a logical arrangement of data. Within each tenant storage area 1612, user storage 1614 and application metadata 1616 might be similarly allocated for each user. For example, a copy of a user's most recently used (MRU) items might be stored to user storage 1614. Similarly, a copy of MRU items for an entire organization that is a tenant might be stored to tenant storage area 1612. A UI 1630 provides a user interface and an API 1632 provides an application programmer interface to system 1516 resident processes to users and/or developers at user systems 1512. The tenant data and the system data may be stored in various databases, such as one or more Oracle™ databases.

Application platform 1518 includes an application setup mechanism 1638 that supports application developers' creation and management of applications, which may be saved as metadata into tenant data storage 1522 by save routines 1636 for execution by subscribers as one or more tenant process spaces 1604 managed by tenant management process 1610 for example. Invocations to such applications may be coded using PL/SOQL 1634 that provides a programming language style interface extension to API 1632. A detailed description of some PL/SOQL language embodiments is discussed in commonly owned co-pending U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 1616 for the subscriber making the invocation and executing the metadata as an application in a virtual machine.

Each application server 1600 may be communicably coupled to database systems, e.g., having access to system data 1525 and tenant data 1523, via a different network connection. For example, one application server $1600_1$ might be coupled via the network 1514 (e.g., the Internet), another application server $1600_{N-1}$ might be coupled via a direct network link, and another application server $1600_N$ might be coupled by yet a different network connection. Transfer Control Protocol and Internet Protocol (TCP/IP) are typical protocols for communicating between application servers 1600 and the database system. However, it will be apparent to one skilled in the art that other transport protocols may be used to optimize the system depending on the network interconnect used.

In certain embodiments, each application server 1600 is configured to handle requests for any user associated with any organization that is a tenant. Because it is desirable to be able to add and remove application servers from the server pool at any time for any reason, there is preferably no server affinity for a user and/or organization to a specific application server 1600. In one embodiment, therefore, an interface system implementing a load balancing function (e.g., an F5 Big-IP load balancer) is communicably coupled between the application servers 1600 and the user systems 1512 to distribute requests to the application servers 1600. In one embodiment, the load balancer uses a least connections algorithm to route user requests to the application servers 1600. Other examples of load balancing algorithms, such as round robin and observed response time, also can be used. For example, in certain embodiments, three consecutive requests from the same user could hit three different application servers 1600, and three requests from different users could hit the same application server 1600. In this manner, system 1516 is multi-tenant, wherein system 1516 handles storage of, and access to, different objects, data and applications across disparate users and organizations.

As an example of storage, one tenant might be a company that employs a sales force where each salesperson uses system 1516 to manage their sales process. Thus, a user might maintain contact data, leads data, customer follow-up data, performance data, goals and progress data, etc., all applicable to that user's personal sales process (e.g., in tenant data storage 1522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1516 might also maintain system level data usable by multiple tenants or other data. Such system level data might include industry reports, news, postings, and the like that are sharable among tenants.

In certain embodiments, user systems 1512 (which may be client systems) communicate with application servers 1600 to request and update system-level and tenant-level data from system 1516 that may require sending one or more queries to tenant data storage 1522 and/or system data storage 1524. System 1516 (e.g., an application server 1600 in system 1516) automatically generates one or more SQL statements (e.g., one or more SQL queries) that are designed to access the desired information. System data storage 1524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed to implement a method, the method comprising:
   receiving results from an execution of a report, where the results include content comprising detailed data and aggregate data summarizing at least a subset of the detailed data;
   converting each of the results to a format including an indicator of whether the content of the result is of a detailed data type or an aggregate data type, where the format further includes a size of the content of the result and the content of the result; and
   storing the converted results in a grouping format with other converted results associated with execution of at least one other report related to the report;
   wherein a single processor retrieves the converted results and the other converted results using the grouping format, such that the retrieved converted results and the other converted results are aggregated, by contiguously retrieving groups of a same subject matter across the converted results and the other converted results, where the groups of the same subject matter are identified by:
      placing a first pointer on a first one of the converted results;
      placing a second pointer on a first one of the other converted results;
      reading the first one of the converted results, using the first pointer;
      reading the first one of the other converted results, using the second pointer;
      determining that the first one of the converted results is of an aggregate data type;
      determining that the first one of the other converted results is of an aggregate data type; and
      comparing a subject matter of the first one of the converted results and the first one of the other converted results to determine whether the group represented by the first one of the converted results is of a same subject matter as the group represented by the first one of the other converted results.

2. The computer program product of claim 1, wherein the report includes one of a plurality of related reports.

3. The computer program product of claim 2, wherein the plurality of reports are distributed across a plurality of processors for execution of the plurality of reports, 4. The computer program product of claim 1, wherein each of the results includes a row of a table.

5. The computer program product of claim 1, wherein the results are received in a table format.

6. The computer program product of claim 1, wherein the grouping format includes, for each of a plurality of groups, storing results having detailed data to be immediately following a result having aggregate data summarizing the detailed data.

7. The computer program product of claim 6, wherein each of the groups is determined from a local report definition for the report.

8. The computer program product of claim 7, wherein the groups are ordered according to the local report definition.

9. The computer program product of claim 1, wherein the converted results are stored in shared memory.

10. The computer program product of claim 1, wherein the results are provided to a code source requesting execution of the report in an order in which the converted results and the other converted results are retrieved.

11. The computer program product of claim 1, wherein the single processor retrieves only a portion of the converted results and the other converted results using the grouping format.

12. The computer program product of claim 11, wherein the portion includes one of the aggregate data, the detailed data, and a subset of the groups.

13. The computer program product of claim 1, wherein the format to which each of the results is converted includes a row of a table, where each row comprises the indicator of the type of content of the result, the size of the content of the result, and the content of the result.

14. A method, comprising:
   receiving results from an execution of a report, where the results include content comprising detailed data and aggregate data summarizing at least a subset of the detailed data;
   converting, utilizing a processor, each of the results to a format including an indicator of whether the content of the result is of a detailed data type or an aggregate data type, where the format further includes a size of the content of the result and the content of the result; and
   storing the converted results in a grouping format with other converted results associated with execution of at least one other report related to the report;
   wherein a single processor retrieves the converted results and the other converted results using the grouping format, such that the retrieved converted results and the other converted results are aggregated, by contiguously retrieving groups of a same subject matter across the converted results and the other converted results, where the groups of the same subject matter are identified by:

placing a first pointer on a first one of the converted results;

placing a second pointer on a first one of the other converted results;

reading the first one of the converted results, using the first pointer;

reading the first one of the other converted results, using the second pointer;

determining that the first one of the converted results is of an aggregate data type;

determining that the first one of the other converted results is of an aggregate data type; and comparing a subject matter of the first one of the converted results and the first one of the other converted results to determine whether the group represented by the first one of the converted results is of a same subject matter as the group represented by the first one of the other converted results.

15. An apparatus, comprising:

a first processor for;

receiving results from an execution of a report, where the results include content comprising detailed data and aggregate data summarizing at least a subset of the detailed data;

converting each of the results to a format including an indicator of whether the content of the result is of a detailed data type or an aggregate data type, where the format further includes a size of the content of the result and the content of the result; and storing the converted results in a grouping format with other converted results associated with execution of at least one other report related to the report;

wherein a second processor retrieves the converted results and the other converted results using the grouping format, such that the retrieved converted results and the other converted results are aggregated, by contiguously retrieving groups of a same subject matter across the converted results and the other converted results, where the groups of the same subject matter are identified by:

placing a first pointer on a first one of the converted results;

placing a second pointer on a first one of the other converted results;

reading the first one of the converted results, using the first pointer;

reading the first one of the other converted results, using the second pointer;

determining that the first one of the converted results is of an aggregate data type;

determining that the first one of the other converted results is of an aggregate data type; and comparing a subject matter of the first one of the converted results and the first one of the other converted results to determine whether the group represented by the first one of the converted results is of a same subject matter as the group represented by the first one of the other converted results.

16. A method for transmitting code, comprising:

transmitting code for receiving results from an execution of a report, where the results include content comprising detailed data and aggregate data summarizing at least a subset of the detailed data;

transmitting code, utilizing a processor, for converting each of the results to a format including an indicator of whether the content of the result is of a detailed data type or an aggregate data type, where the format further includes a size of the content of the result and the content of the result; and transmitting code for storing the converted results in a grouping format with other converted results associated with execution of at least one other report related to the report;

wherein a single processor retrieves the converted results and the other converted results using the grouping format, such that the retrieved converted results and the other converted results are aggregated, by contiguously retrieving groups of a same subject matter across the converted results and the other converted results, where the groups of the same subject matter are identified by:

placing a first pointer on a first one of the converted results;

placing a second pointer on a first one of the other converted results;

reading the first one of the converted results, using the first pointer;

reading the first one of the other converted results, using the second pointer;

determining that the first one of the converted results is of an aggregate data type;

determining that the first one of the other converted results is of an aggregate data type; and comparing a subject matter of the first one of the converted results and the first one of the other converted results to determine whether the group represented by the first one of the converted results is of a same subject matter as the group represented by the first one of the other converted results.

* * * * *